(12) United States Patent
Ma et al.

(10) Patent No.: US 12,362,862 B2
(45) Date of Patent: Jul. 15, 2025

(54) INFORMATION TRANSMISSION METHOD AND COMMUNICATIONS DEVICE

(71) Applicant: Huawei Technologies Co., Ltd., Shenzhen (CN)

(72) Inventors: Ruixiang Ma, Beijing (CN); Shengyu Li, Beijing (CN); Lei Guan, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 600 days.

(21) Appl. No.: 17/111,046

(22) Filed: Dec. 3, 2020

(65) Prior Publication Data

US 2021/0091893 A1     Mar. 25, 2021

Related U.S. Application Data

(63) Continuation of application No. PCT/CN2019/089329, filed on May 30, 2019.

(30) Foreign Application Priority Data

Jun. 4, 2018   (CN) .......................... 201810566032.6

(51) Int. Cl.
*H04L 1/1812* (2023.01)
*H04L 1/1607* (2023.01)
(Continued)

(52) U.S. Cl.
CPC .......... *H04L 1/1812* (2013.01); *H04L 1/1671* (2013.01); *H04L 1/1861* (2013.01); *H04L 5/0055* (2013.01); *H04W 72/21* (2023.01)

(58) Field of Classification Search
CPC ... H04L 1/1812; H04L 1/1671; H04L 1/1861; H04L 5/0055; H04L 5/005; H04L 5/00;
(Continued)

(56) References Cited

U.S. PATENT DOCUMENTS 11,139,940 B2 * 10/2021 Gao ...................... H04L 1/1861
2013/0188587 A1    7/2013 Kwak et al.
(Continued)

FOREIGN PATENT DOCUMENTS

CN      101489255 A      7/2009
CN      102273252 A      12/2011
(Continued)

OTHER PUBLICATIONS

Nokia et al., "Remaining aspects of HARQ management", 3GPP TSG RAN WG1 Meeting #90bis, R1-1718621, Prague, Czech, Oct. 9-13, 2017, 11 pages.
(Continued)

*Primary Examiner* — Hanh N Nguyen
(74) *Attorney, Agent, or Firm* — Slater Matsil, LLP

(57) ABSTRACT

This application provides an information transmission method and a communications device. The method includes: generating, by a terminal device, a hybrid automatic repeat request-acknowledgment HARQ-ACK codebook corresponding to an ith time domain interval, where the ith time domain interval is any one of N time domain intervals of one slot, i is less than or equal to N, i is a positive integer, and N is a positive integer greater than 1; determining, by the terminal device, a physical uplink control channel PUCCH resource corresponding to the HARQ-ACK codebook; and sending, by the terminal device, the HARQ-ACK codebook on the PUCCH resource.

21 Claims, 6 Drawing Sheets

(51) Int. Cl.
*H04L 1/1829* (2023.01)
*H04L 5/00* (2006.01)
*H04W 72/21* (2023.01)

(58) Field of Classification Search
CPC .......... H04L 1/1854; H04L 1/16; H04L 1/18; H04W 72/21; H04W 4/70
See application file for complete search history.

(56) References Cited

U.S. PATENT DOCUMENTS

| | | | | |
|---|---|---|---|---|
| 2018/0006786 A1* | 1/2018 | Guo | ...................... | H04L 1/1812 |
| 2018/0242286 A1* | 8/2018 | Song | ...................... | H04L 1/0072 |
| 2021/0099255 A1* | 4/2021 | Gao | ...................... | H04L 1/1607 |
| 2021/0153185 A1* | 5/2021 | Schober | ................ | H04L 5/0051 |
| 2022/0158767 A1* | 5/2022 | Lei | ........................ | H04L 1/1896 |
| 2022/0217678 A1* | 7/2022 | Yoshioka | ............. | H04W 72/02 |
| 2022/0224455 A1* | 7/2022 | Falahati | ................ | H04L 5/0092 |
| 2023/0142481 A1* | 5/2023 | Yang | ..................... | H04L 1/1854 |
| | | | | 370/329 |
| 2023/0155789 A1* | 5/2023 | Zhang | .................. | H04L 1/1812 |
| | | | | 370/329 |

FOREIGN PATENT DOCUMENTS

| | | |
|---|---|---|
| CN | 103312474 A | 9/2013 |
| CN | 104396174 A | 3/2015 |
| CN | 108023719 A | 5/2018 |
| EP | 2101437 B1 | 2/2015 |
| WO | 2018063059 A1 | 4/2018 |
| WO | 2018080260 A1 | 5/2018 |
| WO | 2019226458 A1 | 11/2019 |

OTHER PUBLICATIONS

Ericsson, "On remaining issues on carrier aggregation", 3GPP TSG RAN WG1 Meeting #92, R1-1802917, Athens, Greece, Feb. 26-Mar. 2, 2018, 15 pages.

Ericsson, "On PUCCH Resource Allocation", 3GPP TSG RAN WG1 Meeting#90bis, R1-1718811, Prague, Czech Republic, Oct. 9-13, 2017, 9 pages.

Huawei et al., "Remaining issues on Harq", 3GPP TSG RAN WG1 Meeting 91, R1-1719401, Reno, NV, US, Nov. 27-Dec. 1, 2017, 14 pages.

CATT, "NR-PUCCH design for low latency communications", 3GPP TSG RAN WG1 Meeting #88bis, R1-1704581, Spokane, WA, US, Apr. 3-7, 2017, 3 pages.

CATT, "PUCCH enhancement for URLLC", 3GPP TSG RAN WG1 Meeting #93 R1-1806294, Busan, Korea, May 21-25, 2018, 6 pages.

3rd Generation Partnership Project; Technical Specification Group Radio Access Network; NR; Multiplexing and channel coding (Release 15), 3GPP TS 38.212 V15.1.1 (Apr. 2018), 90 pages.

CATT, "Remaining issues on HARQ-ACK codebook", 3GPP TSG RAN WG1 Meeting #93 R1-1806301, Busan, Korea, May 21-25, 2018, 7 pages.

3rd Generation Partnership Project; Technical Specification Group Radio Access Network; NR; Physical layer procedures for control (Release 15), 3GPP TS 38.213 V15.1.0 (Mar. 2018), 77 pages.

3rd Generation Partnership Project; Technical Specification Group Radio Access Network; NR; Radio Resource Control (RRC) protocol specification (Release 15), 3GPP TS 38.331 V15.1.0 (Mar. 2018), 268 pages.

* cited by examiner

INFORMATION TRANSMISSION METHOD AND COMMUNICATIONS DEVICE

CROSS-REFERENCE TO RELATED APPLICATIONS

This application is a continuation of International Application No. PCT/CN2019/089329, filed on May 30, 2019, which claims priority to Chinese Patent Application No. 201810566032.6, filed on Jun. 4, 2018. The disclosures of the aforementioned applications are hereby incorporated by reference in their entireties.

TECHNICAL FIELD

This application relates to the communications field, and in particular, to an information transmission method and a communications device.

BACKGROUND

Currently, compared with previous generations of mobile communications systems, a 5th generation (5G) mobile communications technology imposes higher requirements on a transmission rate, a latency, power consumption, and the like. An enhanced mobile broadband (eMBB) service, a massive machine-type communications (mMTC) service, and an ultra-reliable and low-latency communication (URLLC) service are defined as three typical services of 5G. This points out a direction for 5G standard formulation.

As one of the three typical 5G services, the URLLC service is mainly applied to scenarios such as unmanned driving and telemedicine. These application scenarios impose stricter requirements on reliability and a latency. Specific requirements of the URLLC service are as follows: Data transmission reliability reaches 99.999%, a transmission latency is less than 1 ms, and instruction overheads are reduced as much as possible when requirements for high reliability and a low latency are satisfied. Currently, hybrid automatic repeat request-acknowledgment (HARQ-ACK) codebooks generated for different services are in a unit of slot, and a HARQ-ACK codebook is generated by jointly encoding acknowledgment (ACK)/negative-acknowledgment (NACK) information that is to be fed back in a same slot. In this way, only one HARQ-ACK codebook can be fed back on one physical uplink control channel (PUCCH) in one slot. As a result, an ACK/NACK that could have been fed back in the first half of one slot needs to wait to be fed back in the second half of the slot together with the last ACK/NACK to be fed back. Consequently, a latency of the URLLC service increases. In addition, when PUCCHs of different services are intended to be fed back, to ensure reliability of feedback information of a high-reliability service, excessive resources are allocated, resulting in a waste of resources.

Therefore, how to ensure reliability and a latency of the URLLC becomes an urgent problem to be resolved.

SUMMARY

This application provides an information transmission method and a communications device, to ensure a low latency for different services, and reduce a waste of resources as much as possible while ensuring reliability of a PUCCH.

According to a first aspect, an information transmission method is provided. The method includes: generating, by a terminal device, a hybrid automatic repeat request-acknowledgment HARQ-ACK codebook corresponding to an $i^{th}$ time domain interval, where the $i^{th}$ time domain interval is any one of N time domain intervals of one slot, i is less than or equal to N, i is a positive integer, and N is a positive integer greater than 1; determining, by the terminal device, a physical uplink control channel PUCCH resource corresponding to the HARQ-ACK codebook; and sending, by the terminal device, the HARQ-ACK codebook on the PUCCH resource.

In the technical solution in this embodiment of this application, the terminal device may generate one corresponding HARQ-ACK codebook for each time domain interval less than one slot. In other words, the terminal device may generate a plurality of HARQ-ACK codebooks in one slot, to ensure to satisfy different latency requirements of different services. In addition, when PUCCHs of different services are intended to be fed back, the PUCCHs can be separately fed back without joint feedback, thereby avoiding a waste of resources caused by ensuring reliability of some PUCCHs.

With reference to the first aspect, in some implementations of the first aspect, the method further includes: receiving, by the terminal device, first downlink information; determining, by the terminal device based on a time unit in which the first downlink information is located and a first indicator value, a first time unit in which feedback information corresponding to the first downlink information is located, where the first indicator value indicates a quantity of time units between the time unit in which the first downlink information is located and the first time unit, where if the first time unit belongs to the $i^{th}$ time domain interval, the HARQ-ACK codebook that corresponds to the $i^{th}$ time domain interval and that is generated by the terminal device includes the feedback information corresponding to the first time unit.

In the technical solution in this embodiment of this application, the terminal device determines, based on the first indicator value and time domain position information of the downlink information, the HARQ-ACK codebook corresponding to the $i^{th}$ time domain interval, where the $i^{th}$ time domain interval is less than one slot, so that a PUCCH of a low-latency service can be ensured to be quickly fed back, and a latency is ensured. In addition, when PUCCHs of different services are intended to be fed back, the PUCCHs can be separately fed back without joint feedback, thereby avoiding a waste of resources caused by ensuring reliability of PUCCHs of some services.

Optionally, in some implementations of the first aspect, the first indicator value is a value predefined according to a protocol standard.

Optionally, in some implementations of the first aspect, the first indicator value is a value configured based on higher layer signaling.

Optionally, in some implementations of the first aspect, the first indicator value is indicated by first downlink control information sent by a network device, and the first downlink control information may directly indicate the first indicator value; or the first downlink control information may indicate the first indicator value by indicating a value in a set of first indicator values, and the set of first indicator values may be predefined in a protocol or indicated by higher layer signaling.

With reference to the first aspect, in some implementations of the first aspect, the method further includes: receiving, by the terminal device, second downlink information; and determining, by the terminal device, a time domain position of a PUCCH based on a time unit in which the second downlink information is located and a PUCCH resource indicator value, where the PUCCH resource indicator value is used to indicate a start symbol and length information that are of the PUCCH, where if the time domain position of the PUCCH belongs to the $i^{th}$ time domain interval, the HARQ-ACK codebook that corresponds to the $i^{th}$ time domain interval and that is generated by the terminal device includes feedback information of the downlink information corresponding to the time domain position of the PUCCH.

In the technical solution in this embodiment of this application, the terminal device determines, based on time domain position information of the second downlink information and the PUCCH resource indicator value, the HARQ-ACK codebook corresponding to the $i^{th}$ time domain interval, where the $i^{th}$ time domain interval is less than one slot, so that a PUCCH of a low-latency service can be ensured to be quickly fed back, and a latency is ensured. In addition, when PUCCHs of different services are intended to be fed back, the PUCCHs can be separately fed back without joint feedback, thereby avoiding a waste of resources caused by ensuring reliability of PUCCHs of some services.

With reference to the first aspect, in some implementations of the first aspect, a length of the time unit is any one of M symbols, a ½ slot, a ¼ slot, a ⅐ slot, and a ⅛ slot, and M is a positive integer less than 14.

In the technical solution in this embodiment of this application, the length of the time unit is changed to a ½ slot, a ¼ slot, a ⅐ slot, a ⅛ slot, or one or more symbols, so that a user can quickly feed back an ACK/NACK corresponding to a PDSCH, thereby implementing quick feedback, and reducing a feedback latency.

With reference to the first aspect, in some implementations of the first aspect, a first feedback mode is that the terminal device generates the hybrid automatic repeat request-acknowledgment HARQ-ACK codebook corresponding to the $i^{th}$ time domain interval, where the $i^{th}$ time domain interval is any one of N time domain intervals of one slot, i is less than or equal to N, i is a positive integer, and N is a positive integer greater than 1; a second feedback mode is that the terminal device generates a hybrid automatic repeat request-acknowledgment HARQ-ACK codebook corresponding to one slot; and the method further includes determining, by the terminal device, the first feedback mode and/or the second feedback mode.

With reference to the first aspect, in some implementations of the first aspect, the determining, by the terminal device, the first feedback mode and/or the second feedback mode includes: determining, by the terminal device, the first feedback mode and/or the second feedback mode based on first information, where the first information includes at least one of configuration information, a service type, a format of control information for scheduling downlink information, scrambling identifier information of the control information for scheduling the downlink information, a type or an identifier of search space in which the control information for scheduling the downlink information is located, an aggregation level of the control information for scheduling the downlink information, a mapping type of the downlink information, and a time domain length of the downlink information.

With reference to the first aspect, in some implementations of the first aspect, a time domain length of the $i^{th}$ time domain interval is any one of Q symbols, a ½ slot, a ¼ slot, a ⅐ slot, and a ⅛ slot, and Q is a positive integer less than 14.

In the technical solution in this embodiment of this application, one HARQ-ACK codebook is generated for each time domain interval. Because a length of the time domain interval is less than that of one slot, at least two HARQ-ACK codebooks may be generated in one slot, so that at least two PUCCHs are fed back, a PUCCH of a low-latency service can be ensured to be quickly fed back, and a low latency can be ensured. In addition, when PUCCHs of different services are intended to be fed back, the PUCCHs are fed back jointly, thereby avoiding a waste of resources caused by ensuring reliability of some PUCCHs.

With reference to the first aspect, in some implementations of the first aspect, the time domain length of the $i^{th}$ time domain interval is predefined according to a standard or preconfigured by using higher layer signaling.

According to a second aspect, an information transmission method is provided. The method includes: generating, by a terminal device, P hybrid automatic repeat request-acknowledgment HARQ-ACK codebooks corresponding to one slot, where P is a positive integer greater than 1, the slot includes P non-overlapping time domain intervals, and an $i^{th}$ time domain interval in the P non-overlapping time domain intervals corresponds one-to-one to an $i^{th}$ HARQ-ACK codebook in the P HARQ-ACK codebooks; determining, by the terminal device, a physical uplink control channel PUCCH resource corresponding to the $i^{th}$ codebook in the P HARQ-ACK codebooks, where i is a positive integer; and sending, by the terminal device, the $i^{th}$ HARQ-ACK codebook on the PUCCH resource.

In the technical solution in this embodiment of this application, two HARQ-ACK codebooks can be generated in one slot, so that at least two PUCCHs can be fed back, a PUCCH of a low-latency service can be ensured to be quickly fed back, and a low latency can be ensured. In addition, when PUCCHs of different services are intended to be fed back in one slot, the PUCCHs are not be fed back jointly, thereby avoiding a waste of resources caused by ensuring reliability of some PUCCHs.

With reference to the second aspect, in some implementations of the second aspect, the method further includes: receiving, by the terminal device, first downlink information; determining, by the terminal device based on a time unit in which the first downlink information is located and a first indicator value, a first time unit in which feedback information corresponding to the first downlink information is located, where the first indicator value indicates a quantity of time units between the time unit in which the first downlink information is located and the first time unit, where if the first time unit belongs to the $i^{th}$ time domain interval, the $i^{th}$ hybrid automatic repeat request-acknowledgment HARQ-ACK codebook that corresponds to the $i^{th}$ time domain interval, that is in the P HARQ-ACK codebooks, and that is generated by the terminal device includes the feedback information corresponding to the first time unit.

In the technical solution in this embodiment of this application, the terminal device determines, based on the first indicator value and time domain position information of the downlink information, the HARQ-ACK codebook corresponding to the $i^{th}$ time domain interval, where the $i^{th}$ time domain interval is less than one slot, so that a PUCCH of a low-latency service can be ensured to be quickly fed back, and a latency is ensured. In addition, when PUCCHs of different services are intended to be fed back in one slot, the PUCCHs can be separately fed back without joint feedback, thereby avoiding a waste of resources caused by ensuring reliability of PUCCHs of some services.

Optionally, in some implementations of the second aspect, the first indicator value is a value predefined according to a protocol standard.

Optionally, in some implementations of the second aspect, the first indicator value is a value configured based on higher layer signaling.

Optionally, in some implementations of the second aspect, the first indicator value is indicated by first downlink control information sent by a network device, and the first downlink control information may directly indicate the first indicator value; or the first downlink control information may indicate the first indicator value by indicating a value in a set of first indicator values, and the set of first indicator values may be predefined in a protocol or indicated by higher layer signaling.

With reference to the second aspect, in some implementations of the second aspect, the method further includes: receiving, by the terminal device, second downlink information; determining, by the terminal device, a time domain position of a PUCCH based on a time unit in which the second downlink information is located and a PUCCH resource indicator value, where the PUCCH resource indicator value is used to indicate a start symbol and length information that are of the PUCCH, where if the time domain position of the PUCCH belongs to the $i^{th}$ time domain interval, the $i^{th}$ hybrid automatic repeat request-acknowledgment HARQ-ACK codebook that corresponds to the $i^{th}$ time domain interval, that is in the P HARQ-ACK codebooks, and that is generated by the terminal device includes feedback information of the downlink information corresponding to the time domain position of the PUCCH.

In the technical solution in this embodiment of this application, the terminal device determines, based on time domain position information of the second downlink information and the PUCCH resource indicator value, the HARQ-ACK codebook corresponding to the $i^{th}$ time domain interval, where the $i^{th}$ time domain interval is less than one slot, so that a PUCCH of a low-latency service can be ensured to be quickly fed back, and a latency is ensured. In addition, when PUCCHs of different services are intended to be fed back in one slot, the PUCCHs can be separately fed back without joint feedback, thereby avoiding a waste of resources caused by ensuring reliability of PUCCHs of some services.

With reference to the second aspect, in some implementations of the second aspect, a length of the time unit is any one of M symbols, a ½ slot, a ¼ slot, a ⅐ slot, and a ⅛ slot, and M is a positive integer less than 14.

In the technical solution in this embodiment of this application, the length of the time unit is changed to a ½ slot, a ¼ slot, a ⅐ slot, a ⅛ slot, or one or more symbols, so that a user can quickly feed back an ACK/NACK corresponding to a PDSCH, thereby implementing quick feedback, and reducing a feedback latency.

With reference to the second aspect, in some implementations of the second aspect, a first feedback mode is that the terminal device generates the P hybrid automatic repeat request-acknowledgment HARQ-ACK codebooks corresponding to the slot, where i is a positive integer and P is a positive integer greater than 1; the slot includes the P non-overlapping time domain intervals, and the $i^{th}$ time domain interval in the P non-overlapping time domain intervals corresponds one-to-one to the $i^{th}$ HARQ-ACK codebook in the P HARQ-ACK codebooks; a second feedback mode is that the terminal device generates a hybrid automatic repeat request-acknowledgment HARQ-ACK codebook corresponding to one slot; and the method further includes determining, by the terminal device, the first feedback mode and/or the second feedback mode.

With reference to the second aspect, in some implementations of the second aspect, the determining, by the terminal device, the first feedback mode and/or the second feedback mode includes: determining, by the terminal device, the first feedback mode and/or the second feedback mode based on first information, where the first information includes at least one of configuration information, a service type, a format of control information for scheduling downlink information, scrambling identifier information of the control information for scheduling the downlink information, a type or an identifier of search space in which the control information for scheduling the downlink information is located, an aggregation level of the control information for scheduling the downlink information, a mapping type of the downlink information, and a time domain length of the downlink information.

With reference to the second aspect, in some implementations of the second aspect, a time domain length of the $i^{th}$ time domain interval is any one of Q symbols, a ½ slot, a ¼ slot, a ⅐ slot, and a ⅛ slot, and Q is a positive integer less than 14.

In the technical solution in this embodiment of this application, one HARQ-ACK codebook is generated for each time domain interval. Because a length of the time domain interval is less than that of one slot, at least two HARQ-ACK codebooks may be generated in one slot, so that at least two PUCCHs are fed back, a PUCCH of a low-latency service can be ensured to be quickly fed back, and a low latency can be ensured. In addition, when PUCCHs of different services are intended to be fed back, the PUCCHs are not fed back jointly, thereby avoiding a waste of resources caused by ensuring reliability of some PUCCHs.

With reference to the second aspect, in some implementations of the second aspect, the time domain length of the $i^{th}$ time domain interval is predefined according to a standard or preconfigured by using higher layer signaling.

According to a third aspect, an information transmission method is provided. The method includes: determining, by a network device, a physical uplink control channel PUCCH resource; and receiving, by the network device on the PUCCH resource, a hybrid automatic repeat request-acknowledgment HARQ-ACK codebook sent by a terminal device, where the HARQ-ACK codebook is a HARQ-ACK codebook corresponding to an $i^{th}$ time domain interval, the $i^{th}$ time domain interval is any one of N time domain intervals of one slot, i is less than or equal to N, i is a positive integer, and N is a positive integer greater than 1.

In the technical solution in this embodiment of this application, the network device can receive a HARQ-ACK codebook that is generated by the terminal device and that corresponds to a time domain interval less than one slot. In other words, the network device can receive a plurality of HARQ-ACK codebooks in one slot, to ensure to satisfy different low-latency requirements of different services. In addition, when PUCCHs of different services are intended to be fed back in one slot, the PUCCHs are not fed back jointly, thereby avoiding a waste of resources caused by ensuring reliability of some PUCCHs.

With reference to the third aspect, in some implementations of the third aspect, the method further includes: sending, by the network device, first downlink information; determining, by the network device, a first indicator value; and determining, by the network device, a first time unit in which feedback information corresponding to the first downlink information is located, where the first indicator value indicates a quantity of time units between a time unit in which the first downlink information is located and the first time unit, where if the first time unit belongs to the $i^{th}$ time domain interval, the HARQ-ACK codebook corresponding to the $i^{th}$ time domain interval includes the feedback information corresponding to the first time unit.

In the technical solution in this embodiment of this application, the network device can determine the first indicator value and the first time unit in which the feedback information corresponding to the first downlink information is located, the first time unit belongs to the $i^{th}$ time domain interval, and the HARQ-ACK codebook corresponding to the $i^{th}$ time domain interval includes the feedback information corresponding to the first time unit.

Optionally, in some implementations of the third aspect, the first indicator value is a value predefined according to a protocol standard.

Optionally, in some implementations of the third aspect, the first indicator value is a value configured based on higher layer signaling.

Optionally, in some implementations of the third aspect, the first indicator value is indicated by first downlink control information sent by the network device, and the first downlink control information may directly indicate the first indicator value; or the first downlink control information may indicate the first indicator value by indicating a value in a set of first indicator values, and the set of first indicator values may be predefined in a protocol or indicated by higher layer signaling.

With reference to the third aspect, in some implementations of the third aspect, the method further includes: sending, by the network device, second downlink information; sending, by the network device, a PUCCH resource indicator value; and determining, by the network device, a time domain position of a PUCCH, where the PUCCH resource indicator value is used to indicate the time domain position of the PUCCH, where the time domain position of the PUCCH belongs to the $i^{th}$ time domain interval, and the HARQ-ACK codebook corresponding to the $i^{th}$ time domain interval includes feedback information of the downlink information corresponding to the time domain position of the PUCCH.

In the technical solution in this embodiment of this application, the network device can determine the PUCCH resource indicator value and the time domain position of the PUCCH, the time domain position of the PUCCH belongs to the $i^{th}$ time domain interval, and the HARQ-ACK codebook corresponding to the $i^{th}$ time domain interval includes the feedback information of the downlink information corresponding to the time domain position of the PUCCH.

With reference to the third aspect, in some implementations of the third aspect, a length of the time unit is any one of M symbols, a ½ slot, a ¼ slot, a ⅐ slot, and a ⅛ slot, and M is a positive integer less than 14.

In the technical solution in this embodiment of this application, the length of the time unit is changed to a ½ slot, a ¼ slot, a ⅐ slot, a ⅛ slot, or one or more symbols, so that the network device can quickly receive ACK/NACK feedback information that corresponds to a PDSCH and that is fed back by the terminal device, thereby implementing quick scheduling retransmission, and reducing a service latency.

With reference to the third aspect, in some implementations of the third aspect, a first receiving feedback mode is that the network device receives the hybrid automatic repeat request-acknowledgment HARQ-ACK codebook sent by the terminal device, where the HARQ-ACK codebook is the HARQ-ACK codebook corresponding to the $i^{th}$ time domain interval, the $i^{th}$ time domain interval is any one of N time domain intervals of one slot, i is less than or equal to N, i is a positive integer, and N is a positive integer greater than 1; and the method further includes: a second receiving feedback mode, where the second receiving feedback mode is that the network device receives a hybrid automatic repeat request-acknowledgment HARQ-ACK codebook that corresponds to one slot and that is generated by the terminal device; and determining, by the network device, the first receiving feedback mode and/or the second receiving feedback mode.

With reference to the third aspect, in some implementations of the third aspect, the determining, by the network device, the first receiving feedback mode and/or the second receiving feedback mode includes: determining, by the network device, the first receiving feedback mode and/or the second receiving feedback mode based on first information, where the first information includes at least one of configuration information, a service type, a format of control information for scheduling downlink information, scrambling identifier information of the control information for scheduling the downlink information, a type or an identifier of search space in which the control information for scheduling the downlink information is located, an aggregation level of the control information for scheduling the downlink information, a mapping type of the downlink information, and a time domain length of the downlink information.

With reference to the third aspect, in some implementations of the third aspect, a time domain length of the $i^{th}$ time domain interval is any one of Q symbols, a ½ slot, a ¼ slot, a ⅐ slot, and a ⅛ slot, and Q is a positive integer less than 14.

In the technical solution in this embodiment of this application, the network device receives one HARQ-ACK codebook that is generated by the terminal device for each time domain interval. Because a length of the time domain interval is less than that of one slot, at least two HARQ-ACK codebooks may be generated in one slot, so that at least two PUCCHs are fed back, a PUCCH of a low-latency service can be ensured to be quickly fed back, and a low latency can be ensured. In addition, when PUCCHs of different services are intended to be fed back, the PUCCHs are not fed back jointly, thereby avoiding a waste of resources caused by ensuring reliability of some PUCCHs.

With reference to the third aspect, in some implementations of the third aspect, the time domain length of the $i^{th}$ time domain interval is predefined according to a standard or preconfigured by using higher layer signaling.

According to a fourth aspect, an information transmission method is provided. The method includes: determining, by a network device, a physical uplink control channel PUCCH resource corresponding to an $i^{th}$ codebook in P hybrid automatic repeat request-acknowledgment HARQ-ACK codebooks corresponding to one slot, where the slot includes P non-overlapping time domain intervals, an $i^{th}$ time domain interval in the P non-overlapping time domain intervals corresponds one-to-one to the $i^{th}$ HARQ-ACK codebook in the P HARQ-ACK codebooks, P is a positive integer greater than 1, and i is a positive integer; and receiving, by the network device on the PUCCH resource, the $i^{th}$ codebook sent by a terminal device, where the $i^{th}$ codebook is any one of the P HARQ-ACK codebooks corresponding to the slot.

In the technical solution in this embodiment of this application, the network device can receive a plurality of HARQ-ACK codebooks that are generated by the terminal device and that correspond to a time domain interval less than one slot. In other words, the terminal device may generate at least two HARQ-ACK codebooks in one slot, to ensure to satisfy different latency requirements of different services. In addition, when PUCCHs of different services are intended to be fed back, the PUCCHs can be separately fed back without joint feedback, thereby avoiding a waste of resources caused by ensuring reliability of some PUCCHs.

With reference to the fourth aspect, in some implementations of the fourth aspect, the method further includes: sending, by the network device, first downlink information; determining, by the network device, a first indicator value; and determining, by the network device, a first time unit in which feedback information corresponding to the first downlink information is located, where the first indicator value indicates a quantity of time units between a time unit in which the first downlink information is located and the first time unit, where if the first time unit belongs to the $i^{th}$ time domain interval, the $i^{th}$ HARQ-ACK codebook corresponding to the $i^{th}$ time domain interval in the P hybrid automatic repeat request-acknowledgment HARQ-ACK codebooks includes the feedback information corresponding to the first time unit.

In the technical solution in this embodiment of this application, the network device can determine the first indicator value and the first time unit in which the feedback information corresponding to the first downlink information is located, the first time unit belongs to the $i^{th}$ time domain interval, and the HARQ-ACK codebook corresponding to the $i^{th}$ time domain interval includes the feedback information corresponding to the first time unit.

Optionally, in some implementations of the fourth aspect, the first indicator value is a value predefined according to a protocol standard.

Optionally, in some implementations of the fourth aspect, the first indicator value is a value configured based on higher layer signaling.

Optionally, in some implementations of the fourth aspect, the first indicator value is indicated by first downlink control information sent by the network device, and the first downlink control information may directly indicate the first indicator value; or the first downlink control information may indicate the first indicator value by indicating a value in a set of first indicator values, and the set of first indicator values may be predefined in a protocol or indicated by higher layer signaling.

With reference to the fourth aspect, in some implementations of the fourth aspect, the method further includes: sending, by the network device, second downlink information; sending, by the network device, a PUCCH resource indicator value; and determining, by the network device, a time domain position of a PUCCH, where the PUCCH resource indicator value is used to indicate the time domain position of the PUCCH, where the time domain position of the PUCCH belongs to the $i^{th}$ time domain interval, and the $i^{th}$ hybrid automatic repeat request-acknowledgment HARQ-ACK codebook that corresponds to the $i^{th}$ time domain interval, that is in the P HARQ-ACK codebooks, and that is generated by the terminal device includes feedback information of the downlink information corresponding to the time domain position of the PUCCH.

In the technical solution in this embodiment of this application, the network device can determine the PUCCH resource indicator value and the time domain position of the PUCCH, the time domain position of the PUCCH belongs to the $i^{th}$ time domain interval, and the HARQ-ACK codebook corresponding to the $i^{th}$ time domain interval includes the feedback information of the downlink information corresponding to the time domain position of the PUCCH.

With reference to the fourth aspect, in some implementations of the fourth aspect, a length of the time unit is any one of M symbols, a ½ slot, a ¼ slot, a ⅐ slot, and a ⅛ slot, and M is a positive integer less than 14.

In the technical solution in this embodiment of this application, the length of the time unit is changed to a ½ slot, a ¼ slot, a ⅐ slot, a ⅛ slot, or one or more symbols, so that the network device can quickly receive ACK/NACK feedback information that corresponds to a PDSCH and that is fed back by a user, thereby implementing quick scheduling retransmission, and reducing a service latency.

With reference to the fourth aspect, in some implementations of the fourth aspect, a first receiving feedback mode is that the network device determines the physical uplink control channel PUCCH resource corresponding to the $i^{th}$ codebook in the P hybrid automatic repeat request-acknowledgment HARQ-ACK codebooks corresponding to the slot, where the slot includes the P non-overlapping time domain intervals, the $i^{th}$ time domain interval in the P non-overlapping time domain intervals corresponds one-to-one to the $i^{th}$ HARQ-ACK codebook in the P HARQ-ACK codebooks, P is a positive integer greater than 1, and i is a positive integer; and the method further includes: a second receiving feedback mode, where the second receiving feedback mode is that the network device receives a hybrid automatic repeat request-acknowledgment HARQ-ACK codebook corresponding to one slot; and determining, by the network device, the first receiving feedback mode and/or the second receiving feedback mode.

With reference to the fourth aspect, in some implementations of the fourth aspect, the determining, by the network device, the first feedback mode and/or the second feedback mode includes: determining, by the network device, the first receiving feedback mode and/or the second receiving feedback mode based on first information, where the first information includes at least one of configuration information, a service type, a format of control information for scheduling downlink information, scrambling identifier information of the control information for scheduling the downlink information, a type or an identifier of search space in which the control information for scheduling the downlink information is located, an aggregation level of the control information for scheduling the downlink information, a mapping type of the downlink information, and a time domain length of the downlink information.

With reference to the fourth aspect, in some implementations of the fourth aspect, a time domain length of the $i^{th}$ time domain interval is any one of Q symbols, a ½ slot, a ¼ slot, a ⅐ slot, and a ⅛ slot, and Q is a positive integer less than 14.

In the technical solution in this embodiment of this application, one HARQ-ACK codebook is generated for each time domain interval. Because a length of the time domain interval is less than that of one slot, at least two HARQ-ACK codebooks may be generated in one slot, so that at least two PUCCHs are fed back, a PUCCH of a low-latency service can be ensured to be quickly fed back, and a low latency can be ensured. In addition, when PUCCHs of different services are intended to be fed back, the PUCCHs are not fed back jointly, thereby avoiding a waste of resources caused by ensuring reliability of some PUCCHs.

With reference to the fourth aspect, in some implementations of the fourth aspect, the time domain length of the $i^{th}$ time domain interval is predefined according to a standard or preconfigured by using higher layer signaling.

According to a fifth aspect, a communications device for transmitting information is provided. The communications device includes: a processing unit, configured to generate a hybrid automatic repeat request-acknowledgment HARQ-ACK codebook corresponding to an $i^{th}$ time domain interval, where the $i^{th}$ time domain interval is any one of N time domain intervals of one slot, i is less than or equal to N, i is a positive integer, and N is a positive integer greater than 1, where the processing unit is further configured to determine a physical uplink control channel PUCCH resource corresponding to the HARQ-ACK codebook; and a transceiver unit, configured to send the HARQ-ACK codebook on the PUCCH resource.

In the technical solution in this embodiment of this application, a terminal device may generate one corresponding HARQ-ACK codebook for each time domain interval less than one slot. In other words, the terminal device may generate a plurality of HARQ-ACK codebooks in one slot, to ensure to satisfy different latency requirements of different services. In addition, when PUCCHs of different services are intended to be fed back, the PUCCHs can be separately fed back without joint feedback, thereby avoiding a waste of resources caused by ensuring reliability of some PUCCHs.

It should be understood that the communications device in this embodiment of this application may correspond to the terminal device in the foregoing method.

With reference to the fifth aspect, in some implementations of the fifth aspect, the transceiver unit is further configured to: receive first downlink information; and when the transceiver unit receives the first downlink information, the processing unit is further configured to: determine, based on a time unit in which the first downlink information is located and a first indicator value, a first time unit in which feedback information corresponding to the first downlink information is located, where the first indicator value indicates a quantity of time units between the time unit in which the first downlink information is located and the first time unit, where if the first time unit belongs to the $i^{th}$ time domain interval, the generated HARQ-ACK codebook corresponding to the $i^{th}$ time domain interval includes the feedback information corresponding to the first time unit.

In the technical solution in this embodiment of this application, the terminal device determines, based on the first indicator value and time domain position information of the downlink information, the HARQ-ACK codebook corresponding to the $i^{th}$ time domain interval, where the $i^{th}$ time domain interval is less than one slot, so that a PUCCH of a low-latency service can be ensured to be quickly fed back, and a latency is ensured. In addition, when PUCCHs of different services are intended to be fed back in one slot, the PUCCHs can be separately fed back without joint feedback, thereby avoiding a waste of resources caused by ensuring reliability of PUCCHs of some services.

Optionally, in some implementations of the fifth aspect, the first indicator value is a value predefined according to a protocol standard.

Optionally, in some implementations of the fifth aspect, the first indicator value is a value configured based on higher layer signaling.

Optionally, in some implementations of the fifth aspect, the first indicator value is indicated by first downlink control information sent by a network device, and the first downlink control information may directly indicate the first indicator value; or the first downlink control information may indicate the first indicator value by indicating a value in a set of first indicator values, and the set of first indicator values may be predefined in a protocol or indicated by higher layer signaling.

With reference to the fifth aspect, in some implementations of the fifth aspect, the transceiver unit is further configured to: receive second downlink information; and when the transceiver unit receives the second downlink information, the processing unit is further configured to: determine a time domain position of a PUCCH based on a time unit in which the second downlink information is located and a PUCCH resource indicator value, where the PUCCH resource indicator value is used to indicate a start symbol and length information that are of the PUCCH, where if the time domain position of the PUCCH belongs to the $i^{th}$ time domain interval, the generated HARQ-ACK codebook corresponding to the $i^{th}$ time domain interval includes feedback information of the downlink information corresponding to the time domain position of the PUCCH.

In the technical solution in this embodiment of this application, the terminal device determines, based on time domain position information of the second downlink information and the PUCCH resource indicator value, the HARQ-ACK codebook corresponding to the $i^{th}$ time domain interval, where the $i^{th}$ time domain interval is less than one slot, so that a PUCCH of a low-latency service can be ensured to be quickly fed back, and a latency is ensured. In addition, when PUCCHs of different services are intended to be fed back, the PUCCHs can be separately fed back without joint feedback, thereby avoiding a waste of resources caused by ensuring reliability of PUCCHs of some services.

With reference to the fifth aspect, in some implementations of the fifth aspect, a length of the time unit is any one of M symbols, a ½ slot, a ¼ slot, a ⅐ slot, and a ⅛ slot, and M is a positive integer less than 14.

In the technical solution in this embodiment of this application, the length of the time unit is changed to a ½ slot, a ¼ slot, a ⅐ slot, a ⅛ slot, or one or more symbols, so that a user can quickly feed back an ACK/NACK corresponding to a PDSCH, thereby implementing quick feedback, and reducing a feedback latency.

With reference to the fifth aspect, in some implementations of the fifth aspect, a first feedback mode is that the processing unit generates the hybrid automatic repeat request-acknowledgment HARQ-ACK codebook corresponding to the $i^{th}$ time domain interval, where the $i^{th}$ time domain interval is any one of N time domain intervals of one slot, i is less than or equal to N, i is a positive integer, and N is a positive integer greater than 1; and the processing unit is further configured to: determine the first feedback mode and/or a second feedback mode, where the second feedback mode is that the processing unit generates a hybrid automatic repeat request-acknowledgment HARQ-ACK codebook corresponding to one slot.

With reference to the fifth aspect, in some implementations of the fifth aspect, the processing unit is specifically configured to: determine the first feedback mode and/or the second feedback mode based on first information, where the first information includes at least one of configuration information, a service type, a format of control information for scheduling downlink information, scrambling identifier information of the control information for scheduling the downlink information, a type or an identifier of search space in which the control information for scheduling the downlink information is located, an aggregation level of the control information for scheduling the downlink information, a mapping type of the downlink information, and a time domain length of the downlink information.

With reference to the fifth aspect, in some implementations of the fifth aspect, a time domain length of the $i^{th}$ time domain interval is any one of Q symbols, a ½ slot, a ¼ slot, a ⅐ slot, and a ⅛ slot, and Q is a positive integer less than 14.

In the technical solution in this embodiment of this application, one HARQ-ACK codebook is generated for each time domain interval. Because a length of the time domain interval is less than that of one slot, at least two HARQ-ACK codebooks may be generated in one slot, so that at least two PUCCHs are fed back, a PUCCH of a low-latency service can be ensured to be quickly fed back, and a low latency can be ensured. In addition, when PUCCHs of different services are intended to be fed back in one slot, the PUCCHs are not fed back jointly, thereby avoiding a waste of resources caused by ensuring reliability of some PUCCHs.

With reference to the fifth aspect, in some implementations of the fifth aspect, the time domain length of the $i^{th}$ time domain interval is predefined according to a standard or preconfigured by using higher layer signaling.

According to a sixth aspect, a communications device for transmitting information is provided. The communications device includes: a processing unit, configured to determine a physical uplink control channel PUCCH resource; and a transceiver unit, configured to receive, on the PUCCH resource, a hybrid automatic repeat request-acknowledgment HARQ-ACK codebook sent by a terminal device, where the HARQ-ACK codebook is a HARQ-ACK codebook corresponding to an $i^{th}$ time domain interval, the $i^{th}$ time domain interval is any one of N time domain intervals of one slot, i is less than or equal to N, i is a positive integer, and N is a positive integer greater than 1.

In the technical solution in this embodiment of this application, a network device can receive a HARQ-ACK codebook that is generated by the terminal device and that corresponds to a time domain interval less than one slot. In other words, the network device can receive a plurality of HARQ-ACK codebooks in one slot, so that low-latency requirements of different services can be ensured for different services. In addition, when PUCCHs of different services are intended to be fed back in one slot, the PUCCHs are not fed back jointly, thereby avoiding a waste of resources caused by ensuring reliability of some PUCCHs.

With reference to the sixth aspect, in some implementations of the sixth aspect, the transceiver unit is further configured to: send first downlink information; and when the transceiver unit sends the first downlink information, the processing unit is further configured to: determine a first indicator value; and determine a first time unit in which feedback information corresponding to the first downlink information is located, where the first indicator value indicates a quantity of time units between a time unit in which the first downlink information is located and the first time unit, where the first time unit belongs to the $i^{th}$ time domain interval, and the HARQ-ACK codebook corresponding to the $i^{th}$ time domain interval includes the feedback information corresponding to the first time unit.

In the technical solution in this embodiment of this application, the network device can determine the first indicator value and the first time unit in which the feedback information corresponding to the first downlink information is located, the first time unit belongs to the $i^{th}$ time domain interval, and the HARQ-ACK codebook corresponding to the $i^{th}$ time domain interval includes the feedback information corresponding to the first time unit.

Optionally, in some implementations of the sixth aspect, the first indicator value is a value predefined according to a protocol standard.

Optionally, in some implementations of the sixth aspect, the first indicator value is a value configured based on higher layer signaling.

Optionally, in some implementations of the sixth aspect, the first indicator value is indicated by first downlink control information sent by the network device, and the first downlink control information may directly indicate the first indicator value; or the first downlink control information may indicate the first indicator value by indicating a value in a set of first indicator values, and the set of first indicator values may be predefined in a protocol or indicated by higher layer signaling.

With reference to the sixth aspect, in some implementations of the sixth aspect, the transceiver unit is further configured to: send second downlink information; and send a PUCCH resource indicator value; and when the transceiver unit sends the second downlink information and the PUCCH resource indicator value, the processing unit is further configured to: determine a time domain position of a PUCCH, where the PUCCH resource indicator value is used to indicate the time domain position of the PUCCH, where the time domain position of the PUCCH belongs to the $i^{th}$ time domain interval, and the HARQ-ACK codebook corresponding to the $i^{th}$ time domain interval includes feedback information of the downlink information corresponding to the time domain position of the PUCCH.

In the technical solution in this embodiment of this application, the network device can determine the PUCCH resource indicator value and the time domain position of the PUCCH, the time domain position of the PUCCH belongs to the $i^{th}$ time domain interval, and the HARQ-ACK codebook corresponding to the $i^{th}$ time domain interval includes the feedback information of the downlink information corresponding to the time domain position of the PUCCH.

With reference to the sixth aspect, in some implementations of the sixth aspect, a length of the time unit is any one of M symbols, a ½ slot, a ¼ slot, a ⅐ slot, and a ⅛ slot, and M is a positive integer less than 14.

In the technical solution in this embodiment of this application, the length of the time unit is changed to a ½ slot, a ¼ slot, a ⅐ slot, a ⅛ slot, or one or more symbols, so that a user can quickly feed back ACK/NACK feedback information corresponding to a PDSCH, thereby implementing quick feedback, and reducing a feedback latency.

With reference to the sixth aspect, in some implementations of the sixth aspect, a first receiving feedback mode is that the transceiver unit receives the hybrid automatic repeat request-acknowledgment HARQ-ACK codebook sent by the terminal device, where the HARQ-ACK codebook is the HARQ-ACK codebook corresponding to the $i^{th}$ time domain interval, the $i^{th}$ time domain interval is any one of N time domain intervals of one slot, i is less than or equal to N, i is a positive integer, and N is a positive integer greater than 1; and the processing unit is further configured to: determine the first receiving feedback mode and/or a second receiving feedback mode, where the second receiving feedback mode is that the transceiver unit receives a hybrid automatic repeat request-acknowledgment HARQ-ACK codebook that corresponds to one slot and that is generated by the terminal device.

With reference to the sixth aspect, in some implementations of the sixth aspect, the processing unit is specifically configured to: determine the first receiving feedback mode and/or the second receiving feedback mode based on first information, where the first information includes at least one of configuration information, a service type, a format of control information for scheduling downlink information, scrambling identifier information of the control information for scheduling the downlink information, a type or an identifier of search space in which the control information for scheduling the downlink information is located, an aggregation level of the control information for scheduling the downlink information, a mapping type of the downlink information, and a time domain length of the downlink information.

With reference to the sixth aspect, in some implementations of the sixth aspect, a time domain length of the $i^{th}$ time domain interval is any one of Q symbols, a ½ slot, a ¼ slot, a ½ slot, and a ⅛ slot, and Q is a positive integer less than 14.

In the technical solution in this embodiment of this application, the network device receives one HARQ-ACK codebook that is generated by the terminal device for each time domain interval. Because a length of the time domain interval is less than that of one slot, at least two PUCCHs are fed back in one slot, so that a PUCCH of a low-latency service can be ensured to be quickly fed back, and a low latency can be ensured. In addition, when PUCCHs of different services are intended to be fed back in one slot, the PUCCHs are not fed back jointly, thereby avoiding a waste of resources caused by ensuring reliability of some PUCCHs.

With reference to the sixth aspect, in some implementations of the sixth aspect, the time domain length of the $i^{th}$ time domain interval is predefined according to a standard or preconfigured by using higher layer signaling.

According to a seventh aspect, a communications device for transmitting feedback information is provided. The communications device includes a memory and a processor, where the memory is configured to store a computer program, and the processor is configured to invoke and run the computer program in the memory, so that the communications device performs the method according to any one of the first aspect or the second aspect and the implementations thereof.

According to an eighth aspect, a communications device for transmitting feedback information is provided. The communications device includes a memory and a processor, where the memory is configured to store a computer program, and the processor is configured to invoke and run the computer program in the memory, so that the communications device performs the method according to any one of the third aspect or the fourth aspect and the implementations thereof.

According to a ninth aspect, a communications system is provided. The communications system includes the communications device according to any one of the fifth aspect or the possible implementations of the fifth aspect and the communications device according to any one of the sixth aspect or the possible implementations of the sixth aspect.

According to a tenth aspect, a chip system is provided. The chip system includes a memory and a processor, where the memory is configured to store a computer program, and the processor is configured to invoke and run the computer program in the memory, so that a communications device in which the chip system is installed performs the method according to any one of the first aspect or the second aspect and the implementations thereof.

According to an eleventh aspect, a chip system is provided. The chip system includes a memory and a processor, where the memory is configured to store a computer program, and the processor is configured to invoke and run the computer program in the memory, so that a communications device in which the chip system is installed performs the method according to any one of the third aspect or the fourth aspect and the implementations thereof.

According to a twelfth aspect, a computer program product is provided. The computer program product includes computer program code, and when the computer program code is run by a communications unit and a processing unit or a transceiver and a processor that are of a communications device (for example, a terminal device or a network device), the communications device is enabled to perform the method according to any one of the first aspect or the second aspect and the implementations thereof.

According to a thirteenth aspect, a computer program product is provided. The computer program product includes computer program code, and when the computer program code is run by a communications unit and a processing unit or a transceiver and a processor that are of a communications device (for example, a terminal device or a network device), the communications device is enabled to perform the method according to any one of the third aspect or the fourth aspect and the implementations thereof.

According to a fourteenth aspect, a computer-readable storage medium is provided. The computer-readable storage medium stores a program, and the program enables a communications device (for example, a terminal device or a network device) to perform the method according to any one of the first aspect or the second aspect and the implementations thereof.

According to a fifteenth aspect, a computer-readable storage medium is provided. The computer-readable storage medium stores a program, and the program enables a communications device (for example, a terminal device or a network device) to perform the method according to any one of the third aspect or the fourth aspect and the implementations thereof.

DETAILED DESCRIPTION OF ILLUSTRATIVE EMBODIMENTS

Figure 1:
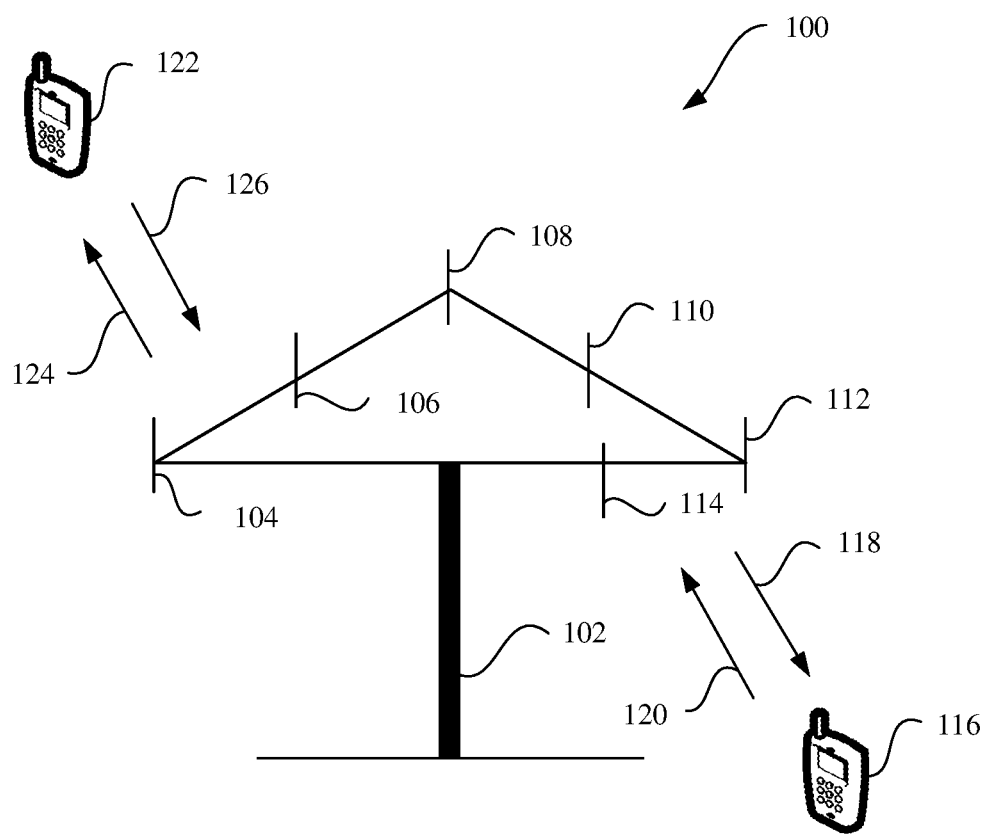
FIG. 1 is a schematic diagram of a communications system according to an embodiment of this application.

The following describes the technical solutions of this application with reference to the accompanying drawings.

Terms such as "component", "module", and "system" used in this application are used to indicate computer-related entities, hardware, firmware, combinations of hardware and software, software, or software being executed. For example, a component may be, but is not limited to, a process that runs on a processor, a processor, an object, an executable file, a thread of execution, a program, and/or a computer. As shown in figures, both an application that runs on a computing device and the computing device may be components. One or more components may reside within a process and/or a thread of execution, and a component may be located on one computer and/or distributed between two or more computers. In addition, these components may be executed from various computer-readable media that store various data structures. The components may communicate with each other by using a local and/or remote process and based on a signal having one or more data packets (for example, data from two components interacting with another component in a local system, a distributed system, and/or across a network such as the internet interacting with other systems by using the signal).

It should be understood that division of manners, cases, types, and embodiments in embodiments of this application are merely for ease of description, but should not constitute any special limitation, and features in various manners, types, cases, and embodiments may be combined when there is no contradiction.

It should further be understood that in the embodiments of this application, "first", "second", and the like are merely intended to indicate different objects, and do not indicate other limitations on the indicated objects.

The technical solutions in the embodiments of this application may be applied to various communications systems, such as: a global system for mobile communications (GSM) system, a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, a 5th generation (5G) system, or a new radio (NR) system.

A terminal device in the embodiments of this application may be user equipment, an access terminal, a subscriber unit, a subscriber station, a mobile station, a remote station, a remote terminal, a mobile device, a user terminal, a terminal, a wireless communications device, a user agent, or a user apparatus. The terminal device may alternatively be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, a terminal device in a future evolved public land mobile network (PLMN), or the like. This is not limited in the embodiments of this application.

A network device in the embodiments of this application may be a device configured to communicate with a terminal device. The network device may be a base transceiver station (BTS) in global system for mobile communications (GSM) or code division multiple access (CDMA), a NodeB (NB) in a wideband code division multiple access (WCDMA) system, an evolved NodeB (eNB or eNodeB) in an LTE system, or a radio controller in a cloud radio access network (CRAN) scenario. Alternatively, the network device may be a relay node, an access point, a vehicle-mounted device, a wearable device, a network device in a future 5G network, a network device in a future evolved PLMN, or the like. This is not limited in the embodiments of this application.

FIG. 1 is a schematic diagram of a communications system 100 used in an embodiment of this application. As shown in FIG. 1, the communications system 100 includes a network device 102, and the network device 102 may include a plurality of antenna groups. Each antenna group may include one or more antennas. For example, one antenna group may include antennas 104 and 106, another antenna group may include antennas 108 and 11o, and an additional group may include antennas 112 and 114. Two antennas are shown for each antenna group in FIG. 1. However, more or fewer antennas may be used for each group. The network device 102 may additionally include a transmitter chain and a receiver chain. A person of ordinary skill in the art may understand that each of the transmitter chain and the receiver chain may include a plurality of components related to signal sending and receiving, for example, a processor, a modulator, a multiplexer, a demodulator, a demultiplexer, or an antenna.

The network device 102 may communicate with a plurality of terminal devices. For example, the network device 102 may communicate with a terminal device 116 and a terminal device 122. However, it may be understood that the network device 102 may communicate with any quantity of terminal devices that are similar to the terminal device 116 or 122. The terminal devices 116 and 122 each may be, for example, a cellular phone, a smartphone, a portable computer, a handheld communications device, a handheld computing device, a satellite radio apparatus, a global positioning system, a PDA, and/or any other suitable device configured to perform communication in the wireless communications system 100.

As shown in FIG. 1, the terminal device 116 communicates with the antennas 112 and 114. The antennas 112 and 114 send information to the terminal device 116 over a forward link 118, and receive information from the terminal device 116 over a reverse link 120. In addition, the terminal device 122 communicates with the antennas 104 and 106. The antennas 104 and 106 send information to the terminal device 122 over a forward link 124, and receive information from the terminal device 122 over a reverse link 126.

For example, in a frequency division duplex FDD system, the forward link 118 may use a frequency band different from that used by the reverse link 120, and the forward link 124 may use a frequency band different from that used by the reverse link 126.

For another example, in a time division duplex TDD system and a full duplex (full duplex) system, the forward link 118 and the reverse link 120 may use a same frequency band, and the forward link 124 and the reverse link 126 may use a same frequency band.

Each antenna group and/or area designed for communication is referred to as a sector of the network device 102. For example, an antenna group may be designed to communicate with a terminal device in a sector within coverage of the network device 102. In a process in which the network device 102 communicates with the terminal devices 116 and 122 respectively over the forward links 118 and 124, a transmit antenna of the network device 102 can decrease signal-to-noise ratios of the forward links 118 and 124 through beamforming. In addition, in comparison with a manner in which the network device sends, through a single antenna, a signal to all terminal devices served by the network device, when the network device 102 sends, through beamforming, a signal to the terminal devices 116 and 122 that are randomly distributed within related coverage, less interference is caused to a mobile device in a neighboring cell.

The network device 102, the terminal device 116, or the terminal device 122 may be a wireless communications sending apparatus and/or a wireless communications receiving apparatus, or may be a communications apparatus in any form. When sending data, the wireless communications sending apparatus may encode the data for transmission. Specifically, the wireless communications sending apparatus may obtain a specific quantity of data bits to be sent to the wireless communications receiving apparatus over a channel. For example, the wireless communications sending apparatus may generate, receive from another communications apparatus, or store in a memory, the specific quantity of data bits to be sent to the wireless communications receiving apparatus over the channel. The data bits may be included in a transport block or a plurality of transport blocks of the data, and the transport block may be segmented to generate a plurality of code blocks.

In addition, the communications system 100 may be a public land mobile network PLMN, a device-to-device (D2D) network, a machine-to-machine (M2M) network, or another network. FIG. 1 is merely an example of a simplified schematic diagram for ease of understanding, and the network may further include another network device that is not shown in FIG. 1.

The following describes in detail a transmission object (namely, a HARQ-ACK codebook) in the embodiments of this application.

It should be noted that, in the embodiments of this application, the HARQ-ACK codebook is a feedback information bit generated by jointly encoding an ACK and a NACK that are intended to be fed back in a time unit.

In the embodiments of this application, a feedback technology may be used for downlink data transmission. By way of example, and not limitation, the feedback technology may include, for example, a hybrid automatic repeat request (HARQ) technology.

The HARQ technology is a technology formed by combining a forward error correction (FEC) coding technology and an automatic repeat request (ARQ) technology.

For example, in the HARQ technology, after receiving data from a transmit end, a receive end may determine whether the data can be correctly decoded. If the data cannot be correctly decoded, the receive end may feed back negative acknowledgment (NACK) information to the transmit end, so that the transmit end may determine, based on the NACK information, that the receive end does not correctly receive the data, and the transmit end may perform retransmission. If the data can be correctly decoded, the receive end may feed back acknowledgment (ACK) information to the transmit end, so that the transmit end may determine, based on the ACK information, that the receive end correctly receives the data, and the transmit end may determine that data transmission is completed.

That is, in the embodiments of this application, when the receive end successfully performs decoding, the receive end may feed back the ACK information to the transmit end; or when the receive end fails to perform decoding, the receive end may feed back the NACK information to the transmit end.

By way of example, and not limitation, in the embodiments of this application, uplink control information may include the ACK information or the NACK information in the HARQ technology.

In NR, the HARQ-ACK codebook may be determined based on a semi-static codebook mode or a dynamic codebook mode.

1. A dynamic codebook is also referred to as a type 2 HARQ-ACK codebook. A terminal device monitors a PDSCH on each downlink control channel (PDCCH) monitoring occasion, and determines, based on a TimeDomainResourceAllocation byte and a PDSCH-to-HARQ-timing byte on a PDCCH, a slot in which the monitored PDSCH scheduled by the PDCCH is to be transmitted, and determines a slot in which a corresponding ACK/NACK is to be fed back.

2. A semi-static codebook is also referred to as a type 1 HARQ-ACK codebook. A terminal device monitors a PDSCH on each downlink control channel (PDCCH) monitoring occasion, and determines, based on a time domain resource allocation byte and a PDSCH-to-HARQ-timing byte (where a corresponding indicator value may be referred to as a first indicator value K1) on a PDCCH, a slot in which the monitored PDSCH scheduled by the PDCCH is to be transmitted, and determines a slot in which a corresponding ACK/NACK is to be fed back. One HARQ-ACK codebook generated in a feedback slot includes not only feedback information of the scheduled PDSCH, but also feedback information of all candidate slots in a PDSCH-to-HARQ-timing set configured based on higher layer signaling. If no data is sent in a corresponding candidate slot, a NACK is filled in a corresponding feedback bit.

Figure 2:
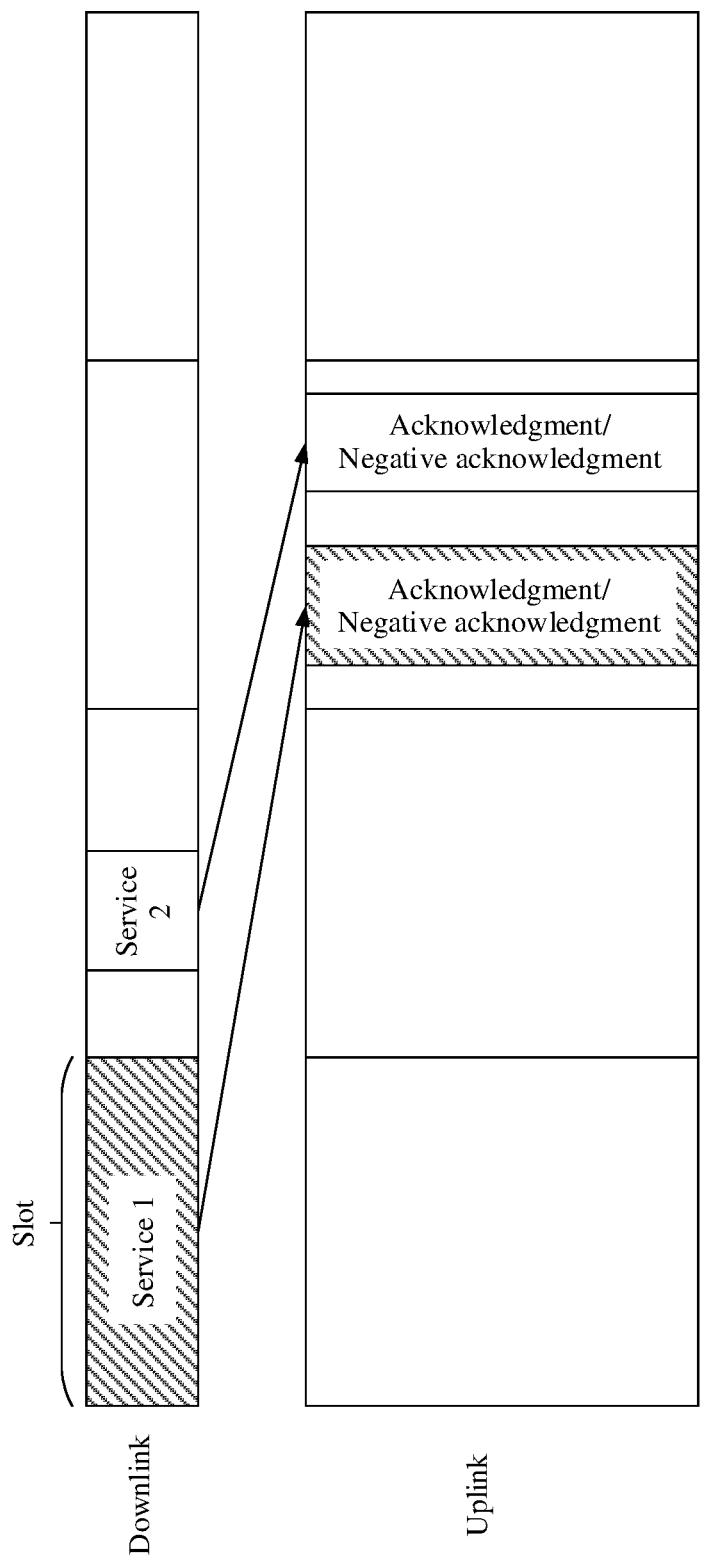
FIG. 2 is a schematic diagram of generating a HARQ-ACK codebook in the prior approaches.

FIG. 2 is a schematic diagram of generating a HARQ-ACK codebook in a dynamic codebook mode in the prior approaches. As shown in FIG. 2, there are a service 1 and a service 2 on a downlink. For example, the service 1 is an eMBB PDSCH, and the service 2 is a URLLC PDSCH. The eMBB PDSCH is received in the first slot, and a first indicator value K1=2 is indicated on a PDCCH, that is, a PUCCH resource corresponding to an eMBB service is in the third slot. The URLLC PDSCH is received in the second slot, and K1=1 is indicated on a PDCCH, that is, a PUCCH resource corresponding to a URLLC service is in the third slot. Both of the indications for the two services on the PDCCHs are fed back in the third slot. During actual feedback performed by a user, one HARQ-ACK codebook is generated for ACKs/NACKs for the eMBB service and the URLLC service, a final PUCCH resource is determined based on an indication on the second PDCCH, namely, the PDCCH of the URLLC service, and then feedback is performed.

It should be understood that, currently, the HARQ-ACK codebook is generated by using a slot as a unit, and one HARQ-ACK codebook is generated for ACKs/NACKs to be fed back in a same slot.

In the schematic diagram of generating a HARQ-ACK codebook shown in FIG. 2, because the URLLC service has a higher reliability requirement, a relatively larger quantity of PUCCH resources are allocated to the URLLC service. The PUCCH resource may include information such as a format, a time domain position, a start position, and an end position, so that PUCCH reliability can be ensured by reducing a code rate. Because ACKs/NACKs for the URLLC service and the eMBB service are intended to be fed back jointly, more resources are also allocated to the eMBB service. This is equivalent to that the eMBB service is transmitted at a same low code rate. Consequently, resources are wasted. In other words, if it is ensured that no resource is wasted, the PUCCH reliability of the URLLC service cannot be ensured.

Figure 3:
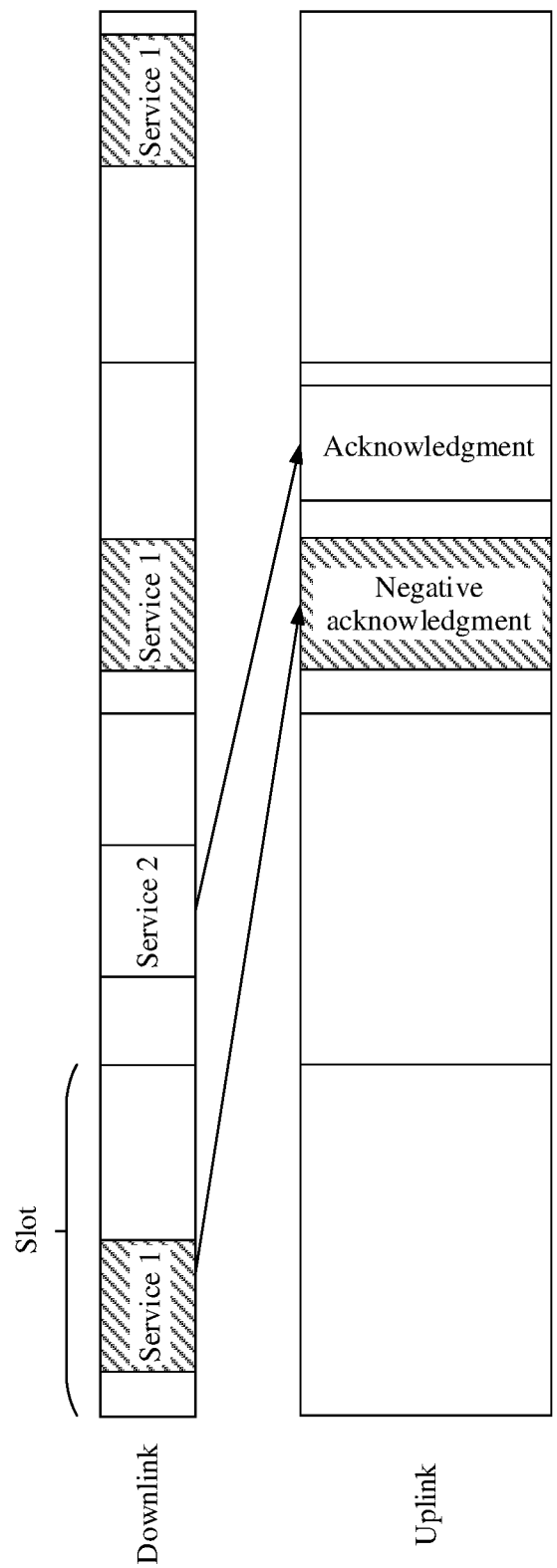
FIG. 3 is a schematic diagram of generating a HARQ-ACK codebook in the prior approaches.

FIG. 3 is a schematic diagram of generating a HARQ-ACK codebook in a dynamic codebook mode in the prior approaches. As shown in FIG. 3, there are a service 1 and a service 2 on a downlink. For example, the service 1 may be a URLLC PDSCH, and the service 2 may be a URLLC PDSCH. The PDSCH of the service 1 is received in the first slot, and K1=2 is indicated on a PDCCH, that is, a PUCCH resource corresponding to the service 1 is in the third slot. The PDSCH of the service 2 is received in the second slot, and K1=1 is indicated on a PDCCH, that is, a PUCCH resource corresponding to the service 2 is in the third slot. Both of the indications for the two services on the PDCCHs are fed back in the third slot. It can be learned from FIG. 3 that, feedback information of the service 1 in the third slot is a NACK, that is, data transmission of the service 1 is incorrect, and corresponding retransmission could have been performed at a position of the service 1 in the third slot on the downlink. However, one HARQ-ACK codebook needs to be generated because HARQs corresponding to data of two URLLC services are to be fed back in a same slot. Consequently, actual feedback information is after an ACK for the service 2. In this case, data of the service 1 can be actually retransmitted only at a position of the service 1 in the fourth slot, resulting in a relatively high latency of transmission of the data of the service 1.

It should be understood that a same service may be transmitted on the downlink, as shown in FIG. 3; or different services may be transmitted on the downlink, as shown in FIG. 2.

Therefore, in the prior approaches, transmission of the HARQ-ACK codebook is performed in a unit of slot, and only one HARQ-ACK codebook is generated for ACKs/NACKs to be fed back in a same slot. On the one hand, only one PUCCH can be fed back in one slot, resulting in an increase in a latency of a URLLC service. On the other hand, when PUCCHs of different services are intended to be fed back, excessive resources are allocated to ensure reliability of a PUCCH of a high-reliability service, resulting in a waste of resources.

The following describes in detail an information transmission method in this application with reference to a specific example. A terminal device generates a hybrid automatic repeat request-acknowledgment HARQ-ACK codebook corresponding to an $i^{th}$ time domain interval, and a length of a time unit in the $i^{th}$ time domain interval is less than one slot (slot).

It should be noted that the descriptions are merely intended to help a person skilled in the art better understand the embodiments of this application, but are not intended to limit the scope of the embodiments of this application.

Figure 4:
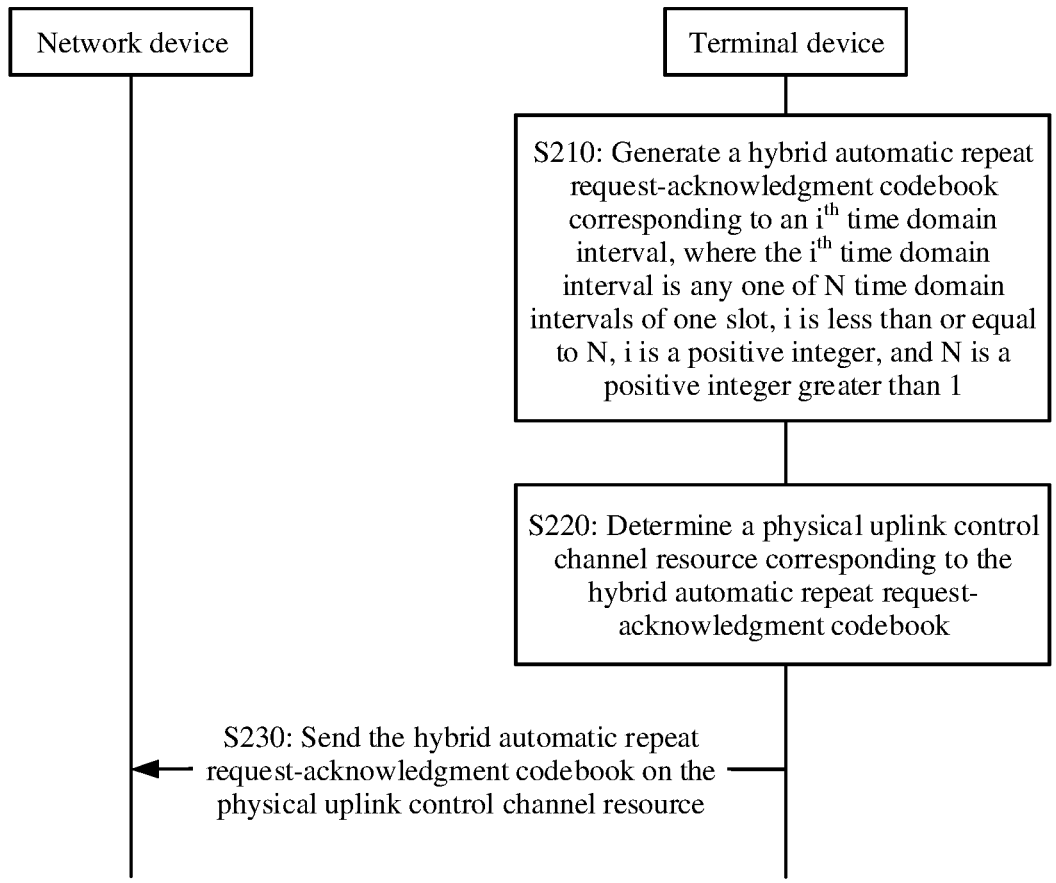
FIG. 4 is a schematic flowchart of an information transmission method according to an embodiment of this application.

FIG. 4 is an interactive flowchart of an information transmission method according to an embodiment of this application.

A terminal device in FIG. 4 may be any terminal device in FIG. 1, and a network device in FIG. 4 may be the network device in FIG. 1. This is not limited in this application.

S210: The terminal device generates a hybrid automatic repeat request-acknowledgment HARQ-ACK codebook corresponding to an $i^{th}$ time domain interval, where the $i^{th}$ time domain interval is any one of N time domain intervals of one slot, i is less than or equal to N, i is a positive integer, and N is a positive integer greater than 1.

For example, the terminal device may generate one HARQ-ACK codebook in a unit of a ½ slot. In this case, in one slot, one HARQ-ACK codebook may be generated for each of the first ½ of the slot and the second ½ of the slot. In other words, two HARQ-ACK codebooks may be generated in one slot. Alternatively, the terminal device may generate one HARQ-ACK codebook in a unit of a ¼ slot. In this case, in one slot, one HARQ-ACK codebook may be generated for each ¼ of the slot. In other words, four HARQ-ACK codebooks may be generated in one slot.

In this embodiment of this application, the network device determines a physical uplink control channel PUCCH resource, and the network device receives, on the determined PUCCH resource, a hybrid automatic repeat request-acknowledgment HARQ-ACK codebook sent by the terminal device, where the HARQ-ACK codebook is the HARQ-ACK codebook corresponding to the $i^{th}$ time domain interval, the $i^{th}$ time domain interval is any one of N time domain intervals of one slot, i is less than or equal to N, i is a positive integer, and N is a positive integer greater than 1.

It should be understood that a length of a time unit in the $i^{th}$ time domain interval may be any one of one symbol, a plurality of symbols, a ½ slot, a ¼ slot, a ⅐ slot, and a ⅛ slot. This is not limited in this embodiment of this application.

It should further be understood that the length of the time unit is predefined according to a standard and/or preconfigured by using higher layer signaling of the terminal device. For example, the length of the time unit predefined according to the standard and/or preconfigured by using the higher layer signaling is a ½ slot, a ¼ slot, a ⅛ slot, or M symbols, where M is a positive integer less than 14.

In this embodiment of this application, the terminal device can generate at least two codebooks in one slot. For example, if a ½ slot is used as a time domain interval, the terminal device may generate two HARQ-ACK codebooks in one slot; or if a ⅐ slot is used as a time domain interval, the terminal device may generate seven HARQ-ACK codebooks in one slot. This is not limited in this embodiment of this application.

S220: The terminal device determines a physical uplink control channel PUCCH resource corresponding to the HARQ-ACK codebook.

In this embodiment of this application, after determining the PUCCH resource, the terminal device sends the PUCCH resource to the network device. In other words, the network device receives, on the PUCCH resource determined by the terminal device, the HARQ-ACK codebook that corresponds to the $i^{th}$ time domain interval and that is generated by the terminal device.

S230: The terminal device sends the HARQ-ACK codebook on the PUCCH resource.

In this embodiment of this application, the network device receives the PUCCH resource determined by the terminal device, and receives, on the PUCCH resource, the hybrid automatic repeat request-acknowledgment HARQ-ACK codebook sent by the terminal device.

It should be noted that there are a dynamic codebook mode and a semi-static codebook mode for the HARQ-ACK codebook. Before the terminal device generates the HARQ-ACK codebook, the network device may send configuration information to the terminal device, and the configuration information is used to indicate that the HARQ-ACK codebook is generated in the dynamic codebook mode or in the semi-static codebook mode.

Optionally, the terminal device may generate, in, but not limited to, the following two manners, the HARQ-ACK codebook corresponding to the $i^{th}$ time domain interval.

Manner 1: The terminal device determines, based on an indicator value and time domain position information of downlink information, the HARQ-ACK codebook corresponding to the $i^{th}$ time domain interval.

It should be understood that a first indicator value indicates an offset value between a time unit of first downlink information and a time unit in which the terminal device feeds back a HARQ-ACK codebook corresponding to the first downlink information, or indicates a quantity of time units between a time unit in which first downlink information is located and a first time unit. A second indicator value indicates an offset value between a time unit of second downlink information and a time unit in which the terminal device feeds back a HARQ-ACK codebook corresponding to the second downlink information, or indicates a quantity of time units between a time unit in which second downlink information is located and a second time unit. The time unit in which the first downlink information is located is a time unit in which the last symbol at a time domain position occupied by the first downlink information is located, or a time unit in which the first symbol at a time domain position occupied by the first downlink information is located. The time unit in which the second downlink information is located is a time unit in which the last symbol at a time domain position occupied by the second downlink information is located, or a time unit in which the first symbol at a time domain position occupied by the second downlink information is located.

In a first possible implementation, the terminal device generates the HARQ-ACK codebook corresponding to the $i^{th}$ time domain interval, and the HARQ-ACK codebook is a codebook generated in the dynamic codebook mode. That is, the terminal device determines, based on a quantity of PDSCHs scheduled by the network device in real time, feedback information included in the codebook.

For example, the network device configures the mode in which the terminal device generates the HARQ-ACK codebook as the dynamic codebook mode.

In an optional embodiment, the terminal device may first determine the first indicator value, and receive the first downlink information. The terminal device may determine, based on the time domain position information of the first downlink information and the first indicator value, the first time unit in which feedback information corresponding to the first downlink information is located. If the terminal device determines that the first time unit belongs to the $i^{th}$ time domain interval, the HARQ-ACK codebook that corresponds to the $i^{th}$ time domain interval and that is generated by the terminal device includes the corresponding feedback information in the first time unit.

Figure 5:
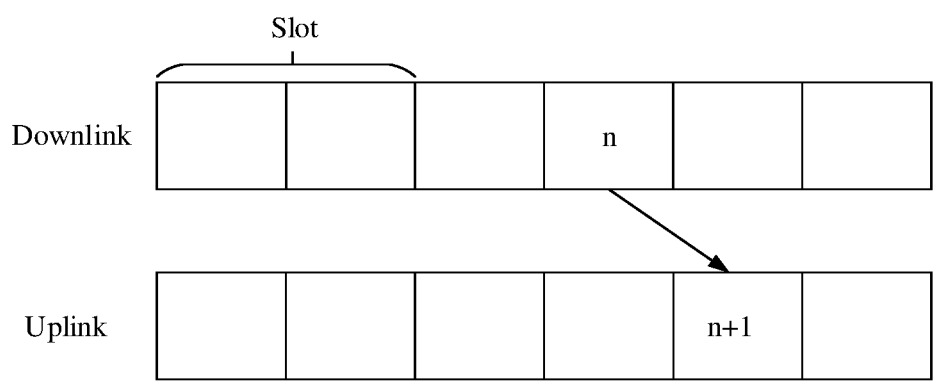
FIG. 5 is a schematic diagram of an information transmission method according to an embodiment of this application.

For example, FIG. 5 is a schematic diagram of generating a HARQ-ACK codebook according to an embodiment of this application. As shown in FIG. 5, it is assumed that the first downlink information received by the terminal device indicates that the first indicator value is 1, and indicates, according to a protocol or based on higher layer configuration information, that a length of a time unit of the first indicator value is a ½ slot, the first downlink information is received by the terminal device in an $n^{th}$ ½ Slot, and the feedback information corresponding to the first downlink information is in an $(n+1)^{th}$ ½ slot, that is, the first time unit is the $(n+1)^{th}$ ½ slot.

If the $i^{th}$ time domain interval includes one first time unit, the HARQ-ACK codebook that corresponds to the $i^{th}$ time domain interval and that is generated by the terminal device is the feedback information corresponding to the first time unit. If the $i^{th}$ time domain interval includes a plurality of first time units, for example, the $i^{th}$ time domain interval is from the $n^{th}$ ½ slot to the $(n+)^{th}$ ½ slot, the HARQ-ACK codebook that corresponds to the $i^{th}$ time domain interval and that is generated by the terminal device includes the feedback information corresponding to the first time unit, namely, feedback information corresponding to the $(n+)^{th}$ ½ slot. The HARQ-ACK codebook that corresponds to the $i^{th}$ time domain interval and that is generated by the terminal device is a codebook generated by jointly encoding feedback information corresponding to the $n^{th}$ ½ slot and the feedback information corresponding to the $(n+1)^{th}$ ½ slot.

In this embodiment of this application, the first indicator value may be a value predefined according to a standard and/or preconfigured by using higher layer signaling. Alternatively, the first indicator value may be first downlink control information that is sent by the network device and that is received by the terminal device, and the first downlink control information includes the first indicator value.

For example, the first indicator value may be determined, as indicated by the first downlink control information, in a set predefined according to a standard.

For example, the first indicator value may be determined, as indicated by the first downlink control information, in a set preconfigured based on higher layer signaling.

In this embodiment of this application, the network device sends the first downlink information to the terminal device. The network device may send one or more pieces of downlink information. The receiving, by the network device on the PUCCH resource, the hybrid automatic repeat request-acknowledgment HARQ-ACK codebook sent by the terminal device includes: determining, by the network device, the first indicator value; and determining, by the network device, the first time unit in which the feedback information corresponding to the first downlink information is located, where the first indicator value indicates the quantity of time units between the time unit in which the first downlink information is located and the first time unit, where the first time unit belongs to the $i^{th}$ time domain interval, and the HARQ-ACK codebook corresponding to the $i^{th}$ time domain interval includes the feedback information corresponding to the first time unit.

In an optional embodiment, the network device configures the mode in which the terminal device generates the HARQ-ACK codebook as the dynamic codebook mode. That is, the terminal device determines, based on a quantity of PDSCHs scheduled by the network device in real time, feedback information included in the codebook. The first indicator value is predefined according to a protocol standard, or is configured by using higher layer signaling sent by the network device, or is indicated by downlink control information sent by the network device. That is, both the network device and the terminal device can determine the first indicator value, the network device determines, based on the first indicator value and the time unit in which the first downlink information is located, the first time unit in which feedback information corresponding to the first downlink information is located, the first time unit belongs to the $i^{th}$ time domain interval, and the HARQ-ACK codebook that corresponds to the $i^{th}$ time domain interval, that is generated by the terminal device, and that is received by the network device includes the feedback information corresponding to the first time unit.

In an optional embodiment, the network device configures the mode in which the terminal device generates the HARQ-ACK codebook as the dynamic codebook mode. That is, the terminal device determines, based on a quantity of PDSCHs scheduled by the network device in real time, feedback information included in the codebook. The network device determines the time unit in which the first downlink information is located and a time unit, namely, the first time unit, in which feedback information corresponding to the first downlink information is located. The network device determines the first indicator value based on the quantity of time units between the time unit in which the first downlink information is located and the first time unit, the first time unit belongs to the $i^{th}$ time domain interval, and the HARQ-ACK codebook that corresponds to the $i^{th}$ time domain interval, that is generated by the terminal device, and that is received by the network device includes the feedback information corresponding to the first time unit.

It should be noted that the first time unit belongs to the $i^{th}$ time domain interval, and an example in which the $i^{th}$ time domain interval is a ½ slot is used for description. For example, both a time domain start position and a time domain end position of the first time unit are within a time domain resource of the ½ slot; or a time domain start position of the first time unit is within a time domain resource of the ½ slot, and a time domain end position of the first time unit is not within the time domain resource of the ½ slot; or a time domain start position of the first time unit is not within a time domain resource of the ½ slot, and a time domain end position of the first time unit is within the time domain resource of the ½ slot. A specific manner to be used is predefined in a protocol, that is, one of the foregoing manners is selected based on the protocol to determine that the first time unit belongs to the $i^{th}$ time domain interval.

It should be understood that in this embodiment of this application, the first indicator value corresponds to a length of a time unit, and the length of the time unit of the first indicator value may be any one of one symbol, a plurality of symbols, a ½ slot, a ¼ slot, a ⅛ slot, or a ⅐ slot. Alternatively, the length of the time unit may be predefined according to a standard and/or preconfigured by using higher layer signaling of the terminal device. This is not limited in this application. In this embodiment of this application, the length of the time unit of the first indicator value is less than or equal to the length of the time unit in the $i^{th}$ time domain interval.

It should be noted that the higher layer signaling may be MAC signaling, or may be signaling sent by a higher protocol layer, and the higher protocol layer is at least one protocol layer above a physical layer. The higher protocol layer may specifically include at least one of the following protocol layers: a medium access control (MAC) layer, a radio link control (RLC) layer, a packet data convergence protocol (PDCP) layer, a radio resource control (RRC) layer, and a non-access stratum (NAS).

In a second possible implementation, the terminal device generates the HARQ-ACK codebook corresponding to the $i^{th}$ time domain interval, and the HARQ-ACK codebook is a codebook generated in the semi-static codebook mode.

For example, the network device configures the mode in which the terminal device generates the HARQ-ACK codebook as the semi-static codebook mode.

In an optional embodiment, the terminal device first determines a second indicator value set, and the second indicator value indicates a quantity of time units between the time unit in which the second downlink information is located and a time unit in which feedback information corresponding to the second downlink information is located. The terminal device determines a time domain position information set of the second downlink information based on the $i^{th}$ time domain interval and the second indicator value set. The terminal device generates the HARQ-ACK codebook in the $i^{th}$ time domain interval based on feedback information of downlink information corresponding to a time unit set in which the second downlink information is located.

It should be understood that in this embodiment of this application, the terminal device may receive at least one piece of second downlink information.

Figure 6:
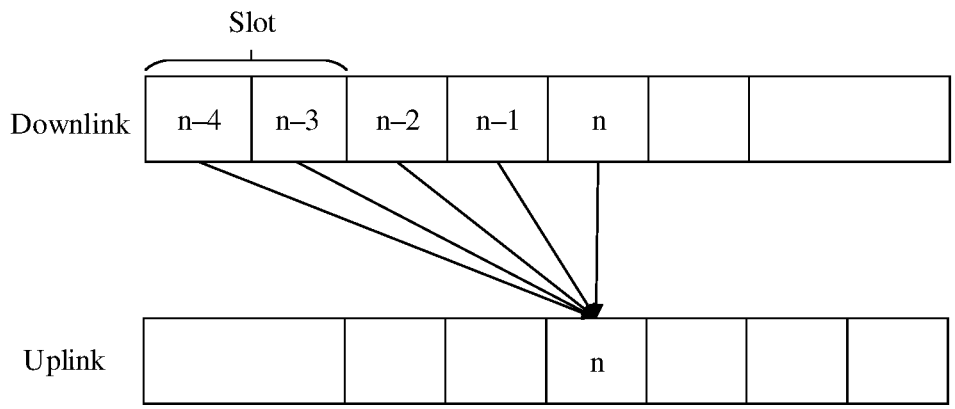
FIG. 6 is a schematic diagram of an information transmission method according to an embodiment of this application.

For example, FIG. 6 is a schematic diagram of generating a HARQ-ACK codebook according to an embodiment of this application. As shown in FIG. 6, the terminal device determines the time domain position information set of the second downlink information based on the $i^{th}$ time domain interval and the second indicator value set. Assuming that the $i^{th}$ time domain interval is an $n^{th}$ ½ slot, the second indicator value set includes {0, 1, 2, 3, 4}, and the time unit of the second indicator value may be a ½ slot, the terminal device may determine that feedback information corresponding to all second downlink information in the $n^{th}$ ½ slot, an $(n-1)^{th}$ ½ slot, an $(n-2)^{th}$ ½ slot, an $(n-3)^{th}$ ½ slot, and an $(n-4)^{th}$ ½ slot can be sent in the $i^{th}$ time domain interval, where the $n^{th}$ ½ slot, the $(n-1)^{th}$ ½ slot, the $(n-2)^{th}$ ½ slot, and the $(n-3)^{th}$ ½ slot form a time domain unit set in which the second downlink information is located. If the terminal device receives at least one piece of second downlink information in the time domain unit set, the feedback information of the terminal device in the $n^{th}$ ½ slot includes ACK/NACK bits corresponding to a set of downlink information in the $n^{th}$ ½ slot, the $(n-1)^{th}$ ½ slot, the $(n-2)^{th}$ ½ slot, the $(n-3)^{th}$ ½ slot, and the $(n-4)^{th}$ ½ slot. The bits are jointly encoded to generate one HARQ-ACK codebook. That is, the terminal device generates, in the $i^{th}$ time domain interval, the HARQ-ACK codebook based on the feedback information of the downlink information corresponding to the time unit set in which the second downlink information is located.

It should be noted that in this embodiment of this application, a length of a time unit of the second indicator value may be less than or equal to a time domain length of the $i^{th}$ time domain interval.

In this embodiment of this application, the second indicator value set may be predefined according to a protocol standard, or the second indicator value set may be configured by using higher layer signaling.

The higher layer signaling may be MAC signaling, or may be signaling sent by a higher protocol layer, and the higher protocol layer is at least one protocol layer above a physical layer. The higher protocol layer may specifically include at least one of the following protocol layers: a medium access control (MAC) layer, a radio link control (RLC) layer, a packet data convergence protocol (PDCP) layer, a radio resource control (RRC) layer, and a non-access stratum (NAS).

In this embodiment of this application, alternatively, the length of the time unit may be predefined according to a standard and/or preconfigured by using higher layer signaling of the terminal device. This is not limited in this application.

For example, the length of the time unit may be any one of one symbol, a plurality of symbols, a ½ slot, a ¼ slot, a ⅐ slot, and a ⅛ slot. This is not limited in this embodiment of this application.

In this embodiment of this application, the length of the time unit of the first indicator value is changed to a ½ slot, a ¼ slot, a ⅐ slot, a ⅛ slot, or one or more symbols (where a specific value may be specified in a protocol or configured by using higher layer signaling), so that a user can quickly feed back an ACK/NACK corresponding to a PDSCH, thereby implementing quick feedback, and reducing a feedback latency.

In this embodiment of this application, the time domain length of the $i^{th}$ time domain interval may be predefined according to a standard or preconfigured by using higher layer signaling of the network device. This is not limited in this application.

The time domain length of the $i^{th}$ time domain interval may be any one of Q symbols, a ½ slot, a ¼ slot, a ⅐ slot, or a ⅛ slot, and Q is a positive integer less than 14.

In this embodiment of this application, one HARQ-ACK codebook is generated by the terminal device for each time domain interval. Because a length of the time domain interval is less than that of one slot, for example, the length of the time domain interval may be specified in a protocol or configured by using higher layer signaling, and may be a ½ slot, a ¼ slot, a ⅐ slot, a ⅛ slot, or one or more symbols, at least two HARQ-ACK codebooks are generated in one slot, so that at least two PUCCHs are fed back, a PUCCH of a low-latency service can be ensured to be quickly fed back, and a latency can be ensured. In addition, when PUCCHs of different services are intended to be fed back, the PUCCHs are not fed back jointly, thereby avoiding a waste of resources caused by ensuring reliability of some PUCCHs.

Manner 2: The terminal device determines, based on time domain position information of downlink information and a PUCCH resource indicator value, the HARQ-ACK codebook corresponding to the $i^{th}$ time domain interval.

It should be understood that in this embodiment of this application, the terminal device may determine, based on an indicator value K1, the time domain position information of the downlink information, and the PUCCH resource indicator value, the HARQ-ACK codebook corresponding to the $i^{th}$ time domain interval.

For example, one slot is divided into a plurality of time domain intervals, and one HARQ-ACK codebook is generated for a determined PUCCH resource in each time domain interval. Because a length of the time domain interval is less than that of one slot, a plurality of HARQ-ACK codebooks are generated in one slot, so that at least two PUCCHs are fed back in one slot.

In a first possible implementation, the terminal device generates the HARQ-ACK codebook corresponding to the $i^{th}$ time domain interval, and the HARQ-ACK codebook is a codebook generated in the dynamic codebook mode.

For example, the network device configures the mode in which the terminal device generates the HARQ-ACK codebook as the dynamic codebook mode.

In an optional embodiment, the terminal device may first determine a first indicator value, and receive first downlink information. The terminal device may determine a time domain position of a first PUCCH resource based on time domain position information of the first downlink information, the first indicator value, and a first PUCCH resource indicator value. If the terminal device determines that a time domain position of the first PUCCH resource belongs to the $i^{th}$ time domain interval, the HARQ-ACK codebook that corresponds to the $i^{th}$ time domain interval and that is generated by the terminal device includes feedback information of the downlink information corresponding to the time domain position of the first PUCCH resource.

The first indicator value indicates an offset value between a time unit of the first downlink information and a time unit in which the terminal device feeds back the HARQ-ACK codebook corresponding to the first downlink information or indicates a quantity of time units between a time unit in which the first downlink information is located and a first time unit. The time unit in which the first downlink information is located is a time unit in which the last symbol at a time domain position occupied by the first downlink information is located, or a time unit in which the first symbol at a time domain position occupied by the first downlink information is located.

The first PUCCH resource indicator value may be used to indicate a start symbol and length information that are of a first PUCCH, that is, the first PUCCH resource indicator value is used to indicate a time domain position of the first PUCCH. The first PUCCH resource indicator value may directly indicate the time domain position of the first PUCCH, or may indicate an index, the index points to a PUCCH in a PUCCH resource set, and a time domain position of the PUCCH is the time domain position of the first PUCCH. If a plurality of PUCCH resource sets are configured for the terminal device, the terminal device first needs to determine one of the PUCCH resource sets based on a quantity of bits of the feedback information, and then determines a specific PUCCH in the PUCCH resource set by using an index indicated by the PUCCH resource indicator value, and a time domain position of the PUCCH is the time domain position of the first PUCCH. If only one PUCCH resource is configured for the terminal device, an index indicated by an indicator value of the PUCCH resource may directly determine the time domain position of the first PUCCH. In this embodiment of this application, the first PUCCH resource indicator value may be carried in first downlink control information.

For example, it is assumed that the first PUCCH resource indicator value directly indicates the time domain position of the first PUCCH. The terminal device receives the first downlink information in an $n^{th}$ slot, the first indicator value indicates one slot, and the first PUCCH resource indicator value indicates that a start symbol is the second symbol and a length is 2. In this case, a time domain resource of a PUCCH corresponding to the first downlink information is on the second to the fourth symbols in an $(n+1)^{th}$ slot.

If the second to the fourth symbols in the $(n+1)^{th}$ slot belong to the $i^{th}$ time domain interval, the HARQ-ACK codebook that corresponds to the $i^{th}$ time domain interval and that is generated by the terminal device includes the feedback information of the downlink information corresponding to the time domain position of the first PUCCH resource.

For another example, it is assumed that the first PUCCH resource indicator value indicates the time domain position of the first PUCCH by indicating an index. The terminal device receives the first downlink information in an $n^{th}$ slot, the first indicator value indicates one slot, the first PUCCH resource indicator value indicates one index, and the index may indicate one PUCCH in a PUCCH resource set. The terminal device determines, based on the index, that a start symbol of the first PUCCH is the second symbol and a length is 2. In this case, a time domain resource of a PUCCH corresponding to the first downlink information is on the second to the fourth symbols in an $(n+1)^{th}$ slot.

If the second to the fourth symbols in the $(n+1)^{th}$ slot belong to the $i^{th}$ time domain interval, the HARQ-ACK codebook that corresponds to the $i^{th}$ time domain interval and that is generated by the terminal device includes the feedback information of the downlink information corresponding to the time domain position of the first PUCCH resource.

If the $i^{th}$ time domain interval includes a time domain position of one first PUCCH resource, the HARQ-ACK codebook that corresponds to the $i^{th}$ time domain interval and that is generated by the terminal device is feedback information of downlink information corresponding to the time domain position of the first PUCCH resource. If time domain positions of a plurality of first PUCCH resources are within the $i^{th}$ time domain interval, for example, the $i^{th}$ time domain interval is from an $n^{th}$ ½ slot to an $(n+1)^{th}$ ½ slot, the HARQ-ACK codebook that corresponds to the $i^{th}$ time domain interval and that is generated by the terminal device includes feedback information of downlink information corresponding to time domain positions of the first PUCCH resources, namely, feedback information corresponding to the $(n+1)^{th}$ ½ slot. The HARQ-ACK codebook that corresponds to the $i^{th}$ time domain interval and that is generated by the terminal device is a codebook generated by jointly encoding feedback information corresponding to the $n^{th}$ ½ slot and the feedback information corresponding to the $(n+1)^{th}$ ½ slot.

It should be noted that the time domain position of the first PUCCH belongs to the $i^{th}$ time domain interval, and an example in which the $i^{th}$ time domain interval is a ½ slot is used for description. For example, both a start position and a time domain end position of the time domain position of the first PUCCH are within a time domain resource of the ½ slot; or a start position of the time domain position of the first PUCCH is within a time domain resource of the ½ slot, and an end position of the time domain position of the first PUCCH is not within the time domain resource of the ½ slot; or a start position of the time domain position of the first PUCCH is not within a time domain resource of the ½ slot, and an end position of the time domain position of the first PUCCH is within the time domain resource of the ½ slot. A specific manner to be used is predefined in a protocol, that is, one of the foregoing manners is selected based on the protocol to determine that the time domain position of the first PUCCH belongs to the $i^{th}$ time domain interval.

In this embodiment of this application, the first indicator value may be a value predefined according to a standard and/or preconfigured by using higher layer signaling. Alternatively, the first indicator value may be first downlink control information that is sent by the network device and that is received by the terminal device, and the first downlink control information includes the first indicator value.

For example, the first indicator value may be determined, as indicated by the first downlink control information, in a set predefined according to a standard.

For example, the first indicator value may be determined, as indicated by the first downlink control information, in a set preconfigured based on higher layer signaling.

In this embodiment of this application, the network device sends second downlink information to the terminal device. The network device sends a PUCCH resource indicator value. The receiving, by the network device on the PUCCH resource, the hybrid automatic repeat request-acknowledgment HARQ-ACK codebook sent by the terminal device includes: determining, by the network device, a time domain position of a PUCCH, where the PUCCH resource indicator value is used to indicate the time domain position of the PUCCH, where the time domain position of the PUCCH belongs to the $i^{th}$ time domain interval, and the HARQ-ACK codebook corresponding to the $i^{th}$ time domain interval includes feedback information of the downlink information corresponding to the time domain position of the PUCCH.

In an optional embodiment, the network device configures the mode in which the terminal device generates the HARQ-ACK codebook as the dynamic codebook mode. That is, the terminal device determines, based on a quantity of PDSCHs scheduled by the network device in real time, feedback information included in the codebook. The PUCCH resource indicator value is carried in downlink control information, and the PUCCH resource indicator value is used to indicate a start symbol and length information that are of a PUCCH. The network device first determines the PUCCH resource indicator value, and determines a time domain position of the PUCCH based on the PUCCH resource indicator value, the time domain position of the PUCCH belongs to the $i^{th}$ time domain interval, and the HARQ-ACK codebook corresponding to the $i^{th}$ time domain interval includes feedback information of the downlink information corresponding to the time domain position of the PUCCH.

In an optional embodiment, the network device configures the mode in which the terminal device generates the HARQ-ACK codebook as the dynamic codebook mode. That is, the terminal device determines, based on a quantity of PDSCHs scheduled by the network device in real time, feedback information included in the codebook. The network device first determines a time domain position of a PUCCH, and determines a PUCCH resource indicator value based on the time domain position of the PUCCH. The network device sends the PUCCH resource indicator value to the terminal device, the PUCCH resource indicator value is carried in downlink control information, and the PUCCH resource indicator value is used to indicate a start symbol and length information that are of the PUCCH. The time domain position of the PUCCH belongs to the $i^{th}$ time domain interval, and the HARQ-ACK codebook corresponding to the $i^{th}$ time domain interval includes feedback information of the downlink information corresponding to the time domain position of the PUCCH.

In this embodiment of this application, alternatively, the length of the time unit may be predefined according to a standard and/or preconfigured by using higher layer signaling of the terminal device. This is not limited in this application.

For example, a length of a time unit of the first indicator value may be any one of M symbols, a ½ slot, a ¼ slot, a ⅐ slot, and a ⅛ slot, and M is a positive integer less than 14.

It should be noted that the higher layer signaling may be MAC signaling, or may be signaling sent by a higher protocol layer, and the higher protocol layer is at least one protocol layer above a physical layer. The higher protocol layer may specifically include at least one of the following protocol layers: a medium access control (MAC) layer, a radio link control (RLC) layer, a packet data convergence protocol (PDCP) layer, a radio resource control (RRC) layer, and a non-access stratum (NAS).

In this embodiment of this application, a reference symbol of the start symbol that is of the PUCCH and that is indicated by the first PUCCH resource indicator value may be a slot boundary, a ½ slot boundary, a ¼ slot boundary, or a ⅛ slot boundary; or may be a symbol boundary, or the like. For example, when a PDSCH is in an $n^{th}$ ½ slot, and K1 is a ½ slot, a reference boundary of the PUCCH is an end symbol position of an $(n+1)^{th}$ ½ slot. For another example, when a PDSCH is on an $n^{th}$ symbol, and K1 indicates five symbols, a reference boundary of the PUCCH is an end position of an $(n+5)^{th}$ symbol.

In this embodiment of this application, a time domain length of the $i^{th}$ time domain interval may be predefined according to a standard or preconfigured by using higher layer signaling of the network device. This is not limited in this application.

The time domain length of the $i^{th}$ time domain interval may be any one of Q symbols, a ½ slot, a ¼ slot, a ⅛ slot, or a ⅟₇ slot, and Q is a positive integer less than 14.

In a second possible implementation, the terminal device generates the HARQ-ACK codebook corresponding to the $i^{th}$ time domain interval, and the HARQ-ACK codebook is a codebook generated in the semi-static codebook mode.

For example, the network device configures the mode of the HARQ-ACK codebook generated by the terminal device to the semi-static codebook mode.

In an optional embodiment, the terminal device determines a second indicator value set, and the terminal device determines, based on the $i^{th}$ time domain interval and the second indicator value set, a time unit set in which second downlink information is located. The terminal device determines a time domain position of a second PUCCH based on the time unit set in which the second downlink information is located, the second indicator value set, and a second PUCCH resource indicator value. If the time domain position of the second PUCCH belongs to the $i^{th}$ time domain interval, the HARQ-ACK codebook that corresponds to the $i^{th}$ time domain interval and that is generated by the terminal device includes feedback information of the downlink information corresponding to the time domain position of the second PUCCH.

For example, the terminal device determines a time domain position information set of the second downlink information based on the $i^{th}$ time domain interval and the second indicator value set. Assuming that the $i^{th}$ time domain interval is an $n^{th}$ ½ slot, the second indicator value set includes {0, 1, 2, 3, 4}, and a time unit of the second indicator value may be a ½ slot, the terminal device may determine that feedback information corresponding to all second downlink information in the $n^{th}$ ½ slot, an $(n-1)^{t}$ ½ slot, an $(n-2)^{t}$ ½ slot, an $(n-3)^{th}$ ½ slot, and an $(n-4)^{th}$ ½ slot can be sent in the $i^{th}$ time domain interval, where the $n^{th}$ ½ slot, the $(n-1)^{th}$ ½ slot, the $(n-2)^{th}$ ½ slot, and the $(n-3)^{th}$ ½ slot form a time domain unit set in which the second downlink information is located. If the terminal device receives at least one piece of second downlink information in the time domain unit set, the terminal device determines one feedback information bit (if the second downlink information is not received, a NACK is filled) based on all to-be-fed-back information in the time domain unit set. If a plurality of PUCCH resource sets are configured for the terminal device, one of the PUCCH resource sets is selected based on the feedback information bit, and then the time domain position of the second PUCCH is determined based on a second indicator value in the last piece of downlink control information. If one PUCCH resource is configured for the terminal device, the time domain position of the second PUCCH may be directly determined based on a second indicator value in the last piece of downlink control information. If the time domain position of the second PUCCH is in the $n^{th}$ ½ slot, feedback information of one HARQ-ACK codebook generated in the $n^{th}$ ½ slot includes ACK/NACK bits corresponding to a set of downlink information in the $n^{th}$ ½ slot, the $(n-1)^{th}$ ½ slot, the $(n-2)^{th}$ ½ slot, the $(n-3)^{th}$ ½ slot, and the $(n-4)^{th}$ ½ slot. The bits are jointly encoded to generate one HARQ-ACK codebook.

The second indicator value indicates a quantity of time units between a time unit in which the second downlink information is located and a time unit in which the feedback information corresponding to the second downlink information is located. The second PUCCH resource indicator value is used to indicate a start symbol and length information that are of the second PUCCH, or information about the time domain position of the second PUCCH. The second PUCCH resource indicator value may directly indicate the time domain position of the second PUCCH, or may indicate an index, the index points to a PUCCH in a PUCCH resource set, and a time domain position of the PUCCH is the time domain position of the second PUCCH. If a plurality of PUCCH resource sets are configured for the terminal device, the terminal device first needs to determine one of the PUCCH resource sets based on a quantity of bits of the feedback information, and then determines a specific PUCCH in the PUCCH resource set by using an index indicated by the PUCCH resource indicator value, and a time domain position of the PUCCH is the time domain position of the second PUCCH. If only one PUCCH resource is configured for the terminal device, an index indicated by an indicator value of the PUCCH resource may directly determine the time domain position of the second PUCCH.

For example, it may be predefined in a standard protocol or indicated by higher layer signaling that one HARQ-ACK codebook is generated when a time domain position of a PUCCH is in the first half of a slot, and the PUCCH needs to be fed back in the same ½ of the slot, another HARQ-ACK codebook is generated when a time domain position of a PUCCH is in the second half of a slot and the PUCCH needs to be fed back in the same ½ of the slot.

It should be noted that the time domain position of the second PUCCH belongs to the $i^{th}$ time domain interval, and an example in which the $i^{th}$ time domain interval is a ½ slot is used for description. For example, both a start position and a time domain end position of the time domain position of the second PUCCH are within a time domain resource of the ½ slot; or a start position of the time domain position of the second PUCCH is within a time domain resource of the ½ slot, and an end position of the time domain position of the second PUCCH is not within the time domain resource of the ½ slot; or a start position of the time domain position of the second PUCCH is not within a time domain resource of the ½ slot, and an end position of the time domain position of the second PUCCH is within the time domain resource of the ½ slot. A specific manner to be used is predefined in a protocol, that is, one of the foregoing manners is selected based on the protocol to determine that the time domain position of the second PUCCH belongs to the $i^{th}$ time domain interval.

In this embodiment of this application, alternatively, the length of the time unit may be predefined according to a standard and/or preconfigured by using higher layer signaling of the terminal device. This is not limited in this application.

A length of the time unit of the second indicator value may be any one of M symbols, a ½ slot, a ¼ slot, a ⅟₇ slot, a ⅛ slot, and one slot, and M is a positive integer less than 14.

It should be noted that the higher layer signaling may be MAC signaling, or may be signaling sent by a higher protocol layer, and the higher protocol layer is at least one protocol layer above a physical layer. The higher protocol layer may specifically include at least one of the following protocol layers: a medium access control (MAC) layer, a radio link control (RLC) layer, a packet data convergence protocol (PDCP) layer, a radio resource control (RRC) layer, and a non-access stratum (NAS).

In this embodiment of this application, a reference symbol of the start symbol that is of the PUCCH and that is indicated by the first PUCCH resource indicator value may be a slot boundary, a ½ slot boundary, a ¼ slot boundary, or a ⅛ slot boundary; or may be a symbol boundary, or the like.

For example, when a PDSCH is in an $n^{th}$ ½ slot, and K1 is a ½ slot, a reference boundary of the PUCCH is an end symbol position of an $(n+1)^{th}$ ½ slot. For another example, when a PDSCH is on an $n^{th}$ symbol, and K1 indicates five symbols, a reference boundary of the PUCCH is an end position of an $(n+5)^{th}$ symbol.

In this embodiment of this application, a time domain length of the $i^{th}$ time domain interval may be predefined according to a standard or preconfigured by using higher layer signaling of the network device. This is not limited in this application.

The time domain length of the $i^{th}$ time domain interval may be any one of Q symbols, a ½ slot, a ¼ slot, a ⅛ slot, or a 1/7 slot, and Q is a positive integer less than 14.

In this embodiment of this application, the terminal device determines, based on the indicator value K1, the time domain position information of the downlink information, and the PUCCH resource indicator value, the HARQ-ACK codebook corresponding to the $i^{th}$ time domain interval, so that a PUCCH of a low-latency service can be ensured to be quickly fed back, and a latency is ensured. In addition, when PUCCHs of different services are intended to be fed back, the PUCCHs can be separately fed back without joint feedback, thereby avoiding a waste of resources caused by ensuring reliability of PUCCHs of some services.

Optionally, in this embodiment of this application, a first feedback mode may be that the terminal device generates the hybrid automatic repeat request-acknowledgment HARQ-ACK codebook corresponding to the $i^{th}$ time domain interval, where the $i^{th}$ time domain interval is any one of N time domain intervals of one slot, i is less than or equal to N, i is a positive integer, and N is a positive integer greater than 1; a second feedback mode may be that the terminal device generates a hybrid automatic repeat request-acknowledgment HARQ-ACK codebook corresponding to one slot. The terminal device determines the first feedback mode and/or the second feedback mode.

Optionally, in this embodiment of this application, the terminal device determines the first feedback mode and/or the second feedback mode based on first information, where the first information includes at least one of configuration information, a service type, a format of control information for scheduling downlink information, scrambling identifier information of the control information for scheduling the downlink information, a type or an identifier of search space in which the control information for scheduling the downlink information is located, an aggregation level of the control information for scheduling the downlink information, a mapping type of the downlink information, and a time domain length of the downlink information.

For example, the terminal device may select the first feedback mode in this embodiment of this application for a URLLC service. An example in which a length of a time unit is a ½ slot is used for description. To be specific, two HARQ-ACK codebooks related to the URLLC service may be generated in one slot. The terminal device may select the second feedback mode for an eMBB service, to be specific, one HARQ-ACK codebook related to the eMBB service is generated in one slot. Three HARQ-ACK codebooks may be generated for a case in which feedback information of a URLLC service and an eMBB service is fed back in a same uplink slot.

For example, the terminal device may select the first feedback mode to feed back HARQ-ACK codebooks of the URLLC service and the eMBB service; or the terminal device may select the first feedback mode to feed back a HARQ-ACK codebook of the URLLC service, and select the second feedback mode to feed back a HARQ-ACK codebook of the eMBB service.

In this embodiment of this application, a first receiving feedback mode is that the network device receives the hybrid automatic repeat request-acknowledgment HARQ-ACK codebook sent by the terminal device, where the HARQ-ACK codebook is the HARQ-ACK codebook corresponding to the $i^{th}$ time domain interval, the $i^{th}$ time domain interval is any one of N time domain intervals of one slot, i is less than or equal to N, i is a positive integer, and N is a positive integer greater than 1. The method further includes: a second receiving feedback mode, where the second receiving feedback mode is that the network device receives a hybrid automatic repeat request-acknowledgment HARQ-ACK codebook that corresponds to one slot and that is generated by the terminal device; and determining, by the network device, the first receiving feedback mode and/or the second receiving feedback mode.

In an optional embodiment, the network device determines the first receiving feedback mode and/or the second receiving feedback mode based on first information, where the first information includes at least one of configuration information, a service type, a format of control information for scheduling downlink information, scrambling identifier information of the control information for scheduling the downlink information, a type or an identifier of search space in which the control information for scheduling the downlink information is located, an aggregation level of the control information for scheduling the downlink information, a mapping type of the downlink information, and a time domain length of the downlink information.

For example, the network device may select the first receiving feedback mode for a URLLC service and an eMBB service; or the network device may select the first receiving feedback mode for feedback for a URLLC service, and select the second receiving feedback mode for feedback for an eMBB service.

In this embodiment of this application, the terminal device may determine, based on a quantity of bits of the HARQ-ACK codebook and a PUCCH resource indicator field on the last received PDCCH, a PUCCH resource for sending the HARQ-ACK codebook.

In an optional embodiment, if a plurality of PUCCH resource sets are configured for the terminal device, the terminal device may select one PUCCH resource set from the plurality of PUCCH resource sets based on the quantity of bits of the generated HARQ-ACK codebook, and then the terminal device determines, based on the PUCCH resource indicator field on the last received PDCCH, the PUCCH resource for sending the HARQ-ACK codebook.

In an optional embodiment, if a PUCCH resource set is configured for the terminal device, the terminal device determines, based on the PUCCH resource indicator field on the last received PDCCH, the PUCCH resource for sending the HARQ-ACK codebook.

For example, if the HARQ-ACK codebook is in the dynamic codebook mode, the terminal device determines, in the PUCCH resource set based on a PUCCH resource indicated by the last piece of downlink control information in a plurality of pieces of received downlink control information, the PUCCH resource for sending the HARQ-ACK codebook; or if the HARQ-ACK codebook is in the semi-static codebook mode, the terminal device determines, in the PUCCH resource set based on a PUCCH resource indicated by the last piece of downlink control information corresponding to all second downlink information in the time domain position information set of the second downlink information, the PUCCH resource for sending the HARQ-ACK codebook.

It should be understood that in the embodiments of this application, the last PDCCH is the last PDCCH in all PDCCHs corresponding to all downlink information for which ACKs/NACKs are to be fed back in a same time domain interval. For example, if ACKs/NACKs of PDSCHs scheduled by three PDCCHs are fed back in the $i^{th}$ time domain interval, the last PDCCH refers to the third one of the three PDCCHs.

It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

The foregoing describes in detail the information transmission method according to the embodiments of this application. In this application, the HARQ-ACK codebook corresponding to the $i^{th}$ time domain interval is generated, and the $i^{th}$ time domain interval is less than one slot. In other words, a plurality of HARQ-ACK codebooks may be generated in one slot, so that low-latency requirements can be ensured for different services. In addition, when PUCCHs of different services are intended to be fed back, the PUCCHs are not fed back jointly, thereby avoiding a waste of resources caused by ensuring reliability of some PUCCHs. It should be understood that the terminal device and the network device in the embodiments of this application may perform the methods in the foregoing embodiments of this application. Therefore, for specific working processes of the following products, refer to corresponding processes in the foregoing method embodiments.

Figure 7:
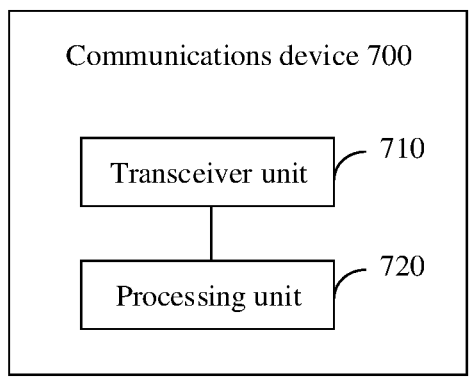
FIG. 7 is a schematic structural diagram of a communications device according to an embodiment of this application.

FIG. 7 is a schematic structural diagram of a communications device 700 according to an embodiment of this application. The communications device 700 may be the terminal device applied to the system shown in FIG. 1. As shown in FIG. 7, the communications device 700 includes a transceiver unit 710 and a processing unit 720.

The transceiver unit 710 and the processing unit 720 communicate with each other through an internal connection path, to transfer a control signal and/or a data signal. In a possible design, the transceiver unit 710 and the processing unit 720 may be implemented by using a chip, to implement a corresponding function of the terminal device in the embodiments of this application.

In this embodiment of this application, the processing unit 720 is configured to generate a hybrid automatic repeat request-acknowledgment HARQ-ACK codebook corresponding to an $i^{th}$ time domain interval, where the $i^{th}$ time domain interval is any one of N time domain intervals of one slot, i is less than or equal to N, i is a positive integer, and N is a positive integer greater than 1.

The processing unit 720 is further configured to determine a physical uplink control channel PUCCH resource corresponding to the HARQ-ACK codebook.

The transceiver unit 710 is configured to send the HARQ-ACK codebook on the PUCCH resource.

In this embodiment of this application, the communications device (for example, the terminal device) may generate one corresponding HARQ-ACK codebook for each time domain interval less than one slot. In other words, the terminal device may generate a plurality of HARQ-ACK codebooks in one slot, to ensure to satisfy different latency requirements of different services. In addition, when PUCCHs of different services are intended to be fed back, the PUCCHs can be separately fed back without joint feedback, thereby avoiding a waste of resources caused by ensuring reliability of some PUCCHs.

Optionally, the transceiver unit 710 is further configured to: receive first downlink information; and when the transceiver unit 710 receives the first downlink information, the processing unit 720 is further configured to: determine, based on a time unit in which the first downlink information is located and a first indicator value, a first time unit in which feedback information corresponding to the first downlink information is located, where the first indicator value indicates a quantity of time units between the time unit in which the first downlink information is located and the first time unit, where if the first time unit belongs to the $i^{th}$ time domain interval, the generated HARQ-ACK codebook corresponding to the $i^{th}$ time domain interval includes the feedback information corresponding to the first time unit.

It should be understood that the first indicator value may be a value predefined according to a protocol standard; or the first indicator value may be a value configured based on higher layer signaling; or the first indicator value may be indicated by first downlink control information sent by a network device, and the first downlink control information may directly indicate the first indicator value, or the first downlink control information may indicate the first indicator value by indicating a value in a set of first indicator values, and the set of first indicator values may be predefined in a protocol or indicated by higher layer signaling.

It should be understood that a length of a time unit of the first indicator value is less than or equal to a time domain length of the $i^{th}$ time domain interval.

It should be noted that the first time unit belongs to the $i^{th}$ time domain interval, and an example in which the $i^{th}$ time domain interval is a ½ slot is used for description. For example, both a time domain start position and a time domain end position of the first time unit are within a time domain resource of the ½ slot; or a time domain start position of the first time unit is within a time domain resource of the ½ slot, and a time domain end position of the first time unit is not within the time domain resource of the ½ slot; or a time domain start position of the first time unit is not within a time domain resource of the ½ slot, and a time domain end position of the first time unit is within the time domain resource of the ½ slot.

Optionally, the transceiver unit 710 is further configured to: receive second downlink information; and when the transceiver unit 710 receives the second downlink information, the processing unit 720 is further configured to: determine a time domain position of a PUCCH based on a time unit in which the second downlink information is located and a PUCCH resource indicator value, where the PUCCH resource indicator value is used to indicate a start symbol and length information that are of the PUCCH, where if the time domain position of the PUCCH belongs to the $i^{th}$ time domain interval, the generated HARQ-ACK codebook corresponding to the $i^{th}$ time domain interval includes feedback information of the downlink information corresponding to the time domain position of the PUCCH.

It should be noted that the time domain position of the PUCCH belongs to the $i^{th}$ time domain interval, and an example in which the $i^{th}$ time domain interval is a ½ slot is used for description. For example, both a start position and a time domain end position of the time domain position of the PUCCH are within a time domain resource of the ½ slot; or a start position of the time domain position of the PUCCH is within a time domain resource of the ½ slot, and an end position of the time domain position of the PUCCH is not within the time domain resource of the ½ slot; or a start position of the time domain position of the PUCCH is not within a time domain resource of the ½ slot, and an end position of the time domain position of the PUCCH is within the time domain resource of the ½ slot.

Optionally, a length of the time unit is any one of M symbols, a ½ slot, a ¼ slot, a 1/7 slot, and a ⅛ slot, and M is a positive integer less than 14.

Optionally, a first feedback mode is that the processing unit generates the hybrid automatic repeat request-acknowledgment HARQ-ACK codebook corresponding to the $i^{th}$ time domain interval, where the $i^{th}$ time domain interval is any one of N time domain intervals of one slot, i is less than or equal to N, i is a positive integer, and N is a positive integer greater than 1; and the processing unit 720 is further configured to: determine the first feedback mode and/or a second feedback mode, where the second feedback mode is that the processing unit generates a hybrid automatic repeat request-acknowledgment HARQ-ACK codebook corresponding to one slot.

Optionally, the processing unit 720 is specifically configured to: determine the first feedback mode and/or the second feedback mode based on first information, where the first information includes at least one of configuration information, a service type, a format of control information for scheduling downlink information, scrambling identifier information of the control information for scheduling the downlink information, a type or an identifier of search space in which the control information for scheduling the downlink information is located, an aggregation level of the control information for scheduling the downlink information, a mapping type of the downlink information, and a time domain length of the downlink information.

Optionally, the time domain length of the $i^{th}$ time domain interval is any one of Q symbols, a ½ slot, a ¼ slot, a 1/7 slot, and a ⅛ slot, and Q is a positive integer less than 14.

Optionally, the time domain length of the $i^{th}$ time domain interval is predefined according to a standard or configured based on higher layer signaling.

It should be understood that although not shown, the communications device 700 may further include other units, for example, an input unit and an output unit.

Figure 8:
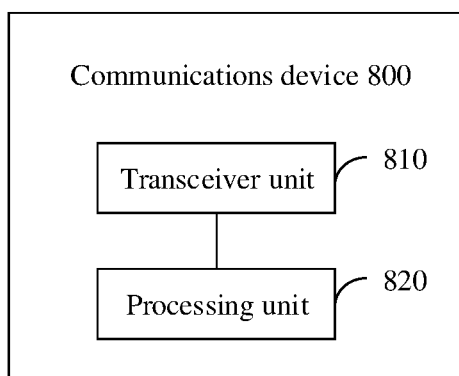
FIG. 8 is a schematic structural diagram of a communications device according to an embodiment of this application.

FIG. 8 is a structural block diagram of a communications device 800 according to an embodiment of this application. The communications device 800 may be the network device applied to the system shown in FIG. 1. As shown in FIG. 8, the communications device 800 includes a transceiver unit 810 and a processing unit 820.

The transceiver unit 810 and the processing unit 820 communicate with each other through an internal connection path, to transfer a control signal and/or a data signal. In a possible design, the transceiver unit 810 and the processing unit 820 may be implemented by using a chip, to implement a corresponding function of the network device in the embodiments of this application.

In this embodiment of this application, the processing unit 820 determines a physical uplink control channel PUCCH resource.

The transceiver unit 810 receives, on the PUCCH resource, a hybrid automatic repeat request-acknowledgment HARQ-ACK codebook sent by a terminal device, where the HARQ-ACK codebook is a HARQ-ACK codebook corresponding to an $i^{th}$ time domain interval, the $i^{th}$ time domain interval is any one of N time domain intervals of one slot, i is less than or equal to N, i is a positive integer, and N is a positive integer greater than 1.

In this embodiment of this application, the communications device (for example, the network device) can receive a HARQ-ACK codebook that is generated by the terminal device and that corresponds to a time domain interval less than one slot. In other words, the terminal device can generate a plurality of HARQ-ACK codebooks in one slot, to ensure low latencies for different services. In addition, when PUCCHs of different services are intended to be fed back, the PUCCHs are not fed back jointly, thereby avoiding a waste of resources caused by ensuring reliability of some PUCCHs.

Optionally, the transceiver unit 810 is further configured to: send first downlink information; and when the transceiver unit 810 sends the first downlink information, the processing unit 820 is further configured to: determine a first indicator value; and determine a first time unit in which feedback information corresponding to the first downlink information is located, where the first indicator value indicates a quantity of time units between a time unit in which the first downlink information is located and the first time unit, where the first time unit belongs to the $i^{th}$ time domain interval, and the HARQ-ACK codebook corresponding to the $i^{th}$ time domain interval includes the feedback information corresponding to the first time unit.

It should be understood that in this embodiment of this application, the network device may first determine the first indicator value, and determine, based on the first indicator value and the time unit in which the first downlink information is located, the first time unit in which the feedback information corresponding to the first downlink information is located; or the network device may first determine the first time unit in which the feedback information corresponding to the first downlink information is located, and determine the first indicator value based on the first time unit and the time unit in which the first downlink information is located. This is not limited in this application.

It should be understood that a length of a time unit of the first indicator value is less than or equal to a time domain length of the $i^{th}$ time domain interval.

It should be noted that the first time unit belongs to the $i^{th}$ time domain interval, and an example in which the $i^{th}$ time domain interval is a ½ slot is used for description. For example, both a time domain start position and a time domain end position of the first time unit are within a time domain resource of the ½ slot; or a time domain start position of the first time unit is within a time domain resource of the ½ slot, and a time domain end position of the first time unit is not within the time domain resource of the ½ slot; or a time domain start position of the first time unit is not within a time domain resource of the ½ slot, and a time domain end position of the first time unit is within the time domain resource of the ½ slot.

Optionally, the transceiver unit 810 is further configured to: send second downlink information; and send a PUCCH resource indicator value; and when the transceiver unit 810 sends the second downlink information and the PUCCH resource indicator value, the processing unit 820 is further configured to: determine a time domain position of a PUCCH, where the PUCCH resource indicator value is used to indicate the time domain position of the PUCCH, where the time domain position of the PUCCH belongs to the $i^{th}$ time domain interval, and the HARQ-ACK codebook corresponding to the $i^{th}$ time domain interval includes feedback information of the downlink information corresponding to the time domain position of the PUCCH.

It should be noted that the time domain position of the PUCCH belongs to the $i^{th}$ time domain interval, and an example in which the $i^{th}$ time domain interval is a ½ slot is used for description. For example, both a start position and a time domain end position of the time domain position of the PUCCH are within a time domain resource of the ½ slot; or a start position of the time domain position of the PUCCH is within a time domain resource of the ½ slot, and an end position of the time domain position of the PUCCH is not within the time domain resource of the ½ slot; or a start position of the time domain position of the PUCCH is not within a time domain resource of the ½ slot, and an end position of the time domain position of the PUCCH is within the time domain resource of the ½ slot.

Optionally, a length of the time unit is any one of M symbols, a ½ slot, a ¼ slot, a ⅐ slot, and a ⅛ slot, and M is a positive integer less than 14.

Optionally, a first receiving feedback mode is that the transceiver unit receives the hybrid automatic repeat request-acknowledgment HARQ-ACK codebook sent by the terminal device, where the HARQ-ACK codebook is the HARQ-ACK codebook corresponding to the $i^{th}$ time domain interval, the $i^{th}$ time domain interval is any one of N time domain intervals of one slot, i is less than or equal to N, i is a positive integer, and N is a positive integer greater than 1; and the processing unit 820 is further configured to: determine the first receiving feedback mode and/or a second receiving feedback mode, where the second receiving feedback mode is that the transceiver unit receives a hybrid automatic repeat request-acknowledgment HARQ-ACK codebook that corresponds to one slot and that is generated by the terminal device.

Optionally, the processing unit 820 is specifically configured to: determine the first receiving feedback mode and/or the second receiving feedback mode based on first information, where the first information includes at least one of configuration information, a service type, a format of control information for scheduling downlink information, scrambling identifier information of the control information for scheduling the downlink information, a type or an identifier of search space in which the control information for scheduling the downlink information is located, an aggregation level of the control information for scheduling the downlink information, a mapping type of the downlink information, and a time domain length of the downlink information.

Optionally, the time domain length of the $i^{th}$ time domain interval is any one of Q symbols, a ½ slot, a ¼ slot, a ⅐ slot, and a ⅛ slot, and Q is a positive integer less than 14.

Optionally, the time domain length of the $i^{th}$ time domain interval is predefined according to a standard or configured based on higher layer signaling.

It should be understood that although not shown, the communications device 800 may further include other units, for example, an input unit and an output unit.

Figure 9:
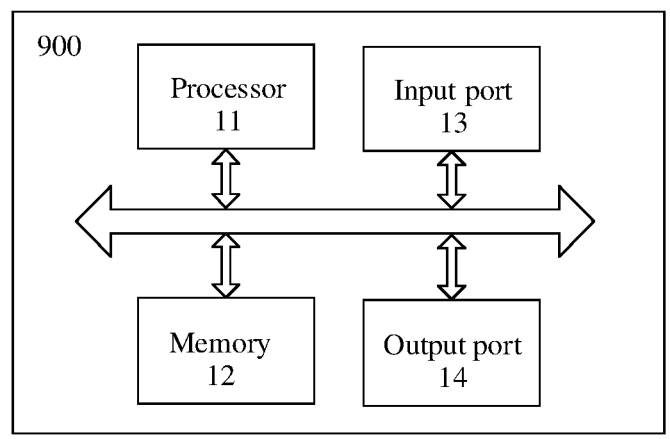
FIG. 9 is a schematic structural diagram of a communications device according to another embodiment of this application.

FIG. 9 is a schematic block diagram of a communications device 900 according to another embodiment of this application. As shown in FIG. 9, the communications device 900 may be a terminal device, or may be a chip or a circuit, for example, a chip or a circuit that may be disposed in a terminal device. The terminal device may correspond to the terminal device in the foregoing method.

The communications device 900 may include a processor 11 (which may be the processing unit 720) and a memory 12. The memory 12 is configured to store an instruction, and the processor 11 is configured to execute the instruction stored in the memory 12, so that the communications device 900 implements the step performed by the terminal device in the method corresponding to FIG. 4.

Further, the communications device 900 may further include an input port 13 (which may be the transceiver unit 710) and an output port 14 (which may be the transceiver unit 710). Further, the processor 11, the memory 12, the input port 13, and the output port 14 may communicate with each other through an internal connection path, to transfer a control signal and/or a data signal. The memory 12 is configured to store a computer program, and the processor n may be configured to invoke and run the computer program in the memory 12. The memory 12 may be integrated into the processor 11, or may be disposed separately from the processor 1.

Optionally, if the communications device 900 is the terminal device, the input port 13 is a receiver and the output port 14 is a transmitter. The receiver and the transmitter may be a same physical entity or different physical entities. When the receiver and the transmitter are a same physical entity, the receiver and the transmitter may be collectively referred to as a transceiver.

Optionally, if the communications device 900 is the chip or the circuit, the input port 13 is an input interface and the output port 14 is an output interface.

In an implementation, it may be considered that functions of the input port 13 and the output port 14 are implemented by using a transceiver circuit or a chip dedicated for sending and receiving. It may be considered that the processor 11 is implemented by using a special purpose processing chip, processing circuit, or processor, or a general purpose chip.

In another implementation, it may be considered that the terminal device provided in the embodiments of this application is implemented by using a general purpose computer. To be specific, program code for implementing functions of the processor 11, the input port 13, and the output port 14 is stored in the memory 12, and a general purpose processor executes the code in the memory 12 to implement the functions of the processor 11, the input port 13, and the output port 14.

The processor is mainly configured to: process a communication protocol and communication data, control the entire terminal device, execute a software program, and process data of the software program, for example, generate a hybrid automatic repeat request-acknowledgment HARQ-ACK codebook corresponding to an $i^{th}$ time domain interval, the $i^{th}$ time domain interval is any one of N time domain intervals of one slot, i is less than or equal to N, i is a positive integer, and N is a positive integer greater than 1. The memory is mainly configured to store a software program and data, for example, store the HARQ-ACK codebook corresponding to the $i^{th}$ time domain interval described in the foregoing embodiment.

A person skilled in the art may understand that for ease of description, FIG. 9 shows only one memory and only one processor. An actual terminal device may have a plurality of processors and a plurality of memories. The memory may also be referred to as a storage medium, a storage device, or the like. This is not limited in this embodiment of this application.

In an optional implementation, the processor may include a baseband processor and a central processing unit. The baseband processor is mainly configured to process a communication protocol and communication data. The central processing unit is mainly configured to: control the entire terminal device, execute a software program, and process data of the software program.

Functions of the baseband processor and the central processing unit are integrated into the processor in FIG. 9. A person skilled in the art may understand that the baseband processor and the central processing unit each may be an independent processor, and are interconnected by using technologies such as a bus.

A person skilled in the art may understand that the terminal device may include a plurality of baseband processors to adapt to different network standards, the terminal device may include a plurality of central processing units to improve a processing capability of the terminal device, and the components of the terminal device may be connected by using various buses. The baseband processor may also be expressed as a baseband processing circuit or a baseband processing chip. The central processing unit may also be expressed as a central processing circuit or a central processing chip. A function of processing the communication protocol and the communication data may be embedded into the processor, or may be stored in a storage unit in a form of a software program. The processor executes the software program to implement a baseband processing function.

For example, in this embodiment of this application, an antenna and a control circuit that have sending and receiving functions may be considered as the transceiver unit 710 of the communications device 700, and a processor having a processing function may be considered as the processing unit 720 of the communications device 700. As shown in FIG. 7, the terminal device 700 includes the transceiver unit 710 and the processing unit 720. The transceiver unit may also be referred to as a transceiver, a transceiver machine, a transceiver communications device, or the like. Optionally, a component, configured to implement a receiving function, in the transceiver unit 710 may be considered as a receiving unit, and a component, configured to implement a sending function, in the transceiver unit 710 may be considered as a sending unit. In other words, the transceiver unit 710 includes the receiving unit and the sending unit. For example, the receiving unit may also be referred to as a receiver machine, a receiver, a receive circuit, or the like, and the sending unit may be referred to as a transmitter machine, a transmitter, a transmit circuit, or the like.

Figure 10:
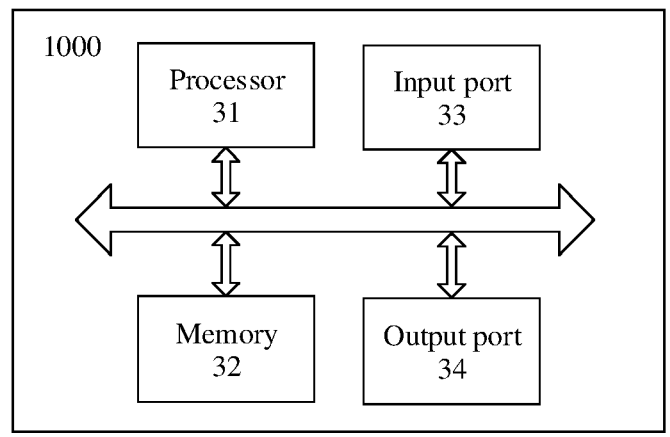
FIG. 10 is a schematic structural diagram of a communications device according to another embodiment of this application.

FIG. 10 is a schematic block diagram of a communications device 1000 according to another embodiment of this application. As shown in FIG. 10, the communications device 1000 may be a network device, or may be a chip or a circuit, for example, a chip or a circuit that may be disposed in a network device. The network device corresponds to the network device in the foregoing method.

The communications device 1000 may include a processor 31 (which may be the processing unit 820) and a memory 32. The memory 32 is configured to store an instruction, and the processor 31 is configured to execute the instruction stored in the memory 32, so that the communications device 1000 implements the step performed by the network device in the method corresponding to FIG. 2.

Further, the communications device 1000 may further include an input port 33 (which may be the transceiver unit 810) and an output port 33 (which may be the transceiver unit 810). Still further, the processor 31, the memory 32, the input port 33, and the output port 34 may communicate with each other through an internal connection path, to transfer a control signal and/or a data signal. The memory 32 is configured to store a computer program, and the processor 31 may be configured to invoke and run the computer program in the memory 32, to control the input port 33 to receive a signal and control the output port 34 to send a signal, to complete the step performed by the network device in the method in FIG. 4. The memory 32 may be integrated into the processor 31, or may be disposed separately from the processor 31.

The processor 31 controls the input port 33 to receive a signal and controls the output port 34 to send a signal, to complete the step performed by the network device in the foregoing method. The memory 32 may be integrated into the processor 31, or may be disposed separately from the processor 31.

Optionally, if the communications device 1000 is the network device, the input port 33 is a receiver and the output port 34 is a transmitter. The receiver and the transmitter may be a same physical entity or different physical entities. When the receiver and the transmitter are a same physical entity, the receiver and the transmitter may be collectively referred to as a transceiver.

Optionally, if the communications device 1000 is the chip or the circuit, the input port 33 is an input interface and the output port 34 is an output interface.

Optionally, if the communications device 1000 is the chip or the circuit, alternatively, the communications device 1000 may not include the memory 32, and the processor 31 may read an instruction (a program or code) from a memory outside the chip, to implement a function of the network device in the method corresponding to FIG. 4.

In an implementation, it may be considered that functions of the input port 33 and the output port 34 are implemented by using a transceiver circuit or a chip dedicated for sending and receiving. It may be considered that the processor 31 is implemented by using a special purpose processing chip, processing circuit, or processor, or a general purpose chip.

In another implementation, it may be considered that the network device provided in the embodiments of this application is implemented by using a general purpose computer. To be specific, program code for implementing functions of the processor 31, the input port 33, and the output port 34 is stored in the memory, and a general purpose processor executes the code in the memory to implement the functions of the processor 31, the input port 33, and the output port 34.

In this embodiment of this application, FIG. 10 may be a schematic structural diagram of a network device. The network device may be configured to implement a function of the network device in the foregoing method. The processor 31 may implement a function of the processing unit 820 in the communications device 800, and the input port 33 and the output port 34 may implement a function of the transceiver unit 810 in the communications device 800. This is not limited in this application.

The information transmission method in the foregoing embodiments of this application may be applied to a processor, or may be implemented by a processor. The processor may be an integrated circuit chip and has a signal processing capability. In an implementation process, the steps in the foregoing method may be implemented by using a hardware integrated logical circuit in the processor, or by using an instruction in a form of software. The processor may be a general purpose processor, a digital signal processor (DSP), an application-specific integrated circuit (ASIC), a field programmable gate array (FPGA) or another programmable logic device, a discrete gate or transistor logic device, a discrete hardware component, a system on chip (SoC), a central processing unit (CPU), a network processor (NP), a digital signal processor (DSP), a micro controller unit (MCU), a programmable controller (PLD), or another integrated chip. The processor may implement or perform the methods, the steps, and the logical block diagrams that are disclosed in the embodiments of this application. The general purpose processor may be a microprocessor, or the processor may be any conventional processor or the like. Steps of the methods disclosed with reference to the embodiments of this application may be directly performed and accomplished by using a hardware decoding processor, or may be performed and accomplished by using a combination of hardware and software modules in the decoding processor. The software module may be located in a mature storage medium in the art, such as a random access memory (RAM), a flash memory, a read-only memory (ROM), a programmable read-only memory, an electrically erasable programmable memory, a register, or the like. The storage medium is located in the memory, and a processor reads the instruction in the memory and completes the steps in the foregoing methods in combination with hardware of the processor.

It may be understood that, when this embodiment of this application is applied to a chip in a network device, the chip in the network device implements a function of the network device in the foregoing method embodiment. The chip in the network device receives an uplink shared channel and uplink data from another module (for example, a radio frequency module or an antenna) in the network device. The uplink shared channel and downlink data are sent by a terminal device to a base station.

All or some of the foregoing embodiments may be implemented by using software, hardware, firmware, or any combination thereof. When software is used to implement the embodiments, the foregoing embodiments may be implemented completely or partially in a form of a computer program product. The computer program product includes one or more computer instructions or computer programs. When the program instructions or the computer programs are loaded and executed on a computer, the procedures or the functions according to the embodiments of this application are all or partially generated. The computer may be a general purpose computer, a special purpose computer, a computer network, or another programmable communications device. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

A person skilled in the art may clearly understand that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be another division manner in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit.

When functions are implemented in a form of a software functional unit and sold or used as an independent product, the functions may be stored in a computer-readable storage medium. Based on such an understanding, the technical solutions of this application essentially, or the part contributing to the prior approaches, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method performed by a communications apparatus, comprising:
generating a hybrid automatic repeat request-acknowledgment (HARQ-ACK) codebook corresponding to an $i^{th}$ time domain interval, wherein the $i^{th}$ time domain interval is a time domain interval of N time domain intervals of a slot, i is less than or equal to N, i is a positive integer, N is a positive integer greater than 1, the N time domain intervals form the slot, each of the N time domain intervals corresponding to a different HARQ-ACK codebook of N HARQ-ACK codebooks, the N HARQ-ACK codebooks including the HARQ-ACK codebook; and
sending the HARQ-ACK codebook in the slot.

2. The method according to claim 1, further comprising:
receiving first downlink information; and
determining, based on a time unit in which the first downlink information is received and a first indicator value, a first time unit in which feedback information corresponding to the first downlink information is instructed to be sent, wherein the first indicator value indicates a quantity of time units between the time unit in which the first downlink information is received and the first time unit; and
wherein when the first time unit belongs to the $i^{th}$ time domain interval, the HARQ-ACK codebook that corresponds to the $i^{th}$ time domain interval comprises the feedback information corresponding to the first time unit.

3. The method according to claim 2, wherein the time unit in which the first downlink information is received is the time unit in which a last symbol at a time domain position occupied by the first downlink information is received.

4. The method according to claim 2, wherein a length of the first time unit is M symbols, a ½ slot, a ¼ slot, a ⅐ slot, or a ⅛ slot, and M is a positive integer less than 14.

5. The method according to claim 2, further comprising:
receiving second indication information from a network device, wherein the second indication information indicates the first indicator value, and the second indication information is carried in higher layer signaling.

6. The method according to claim 2, further comprising:
receiving first downlink control information from a network device, wherein:
the first downlink control information indicates the first indicator value; or
the first downlink control information indicates a value in a set of first indicator values to indicate the first indicator value, and the set of first indicator values is predefined, or indicated by higher layer signaling.

7. The method according to claim 1, wherein a time domain length of the $i^{th}$ time domain interval is Q symbols, a ½ slot, a ¼ slot, a ⅐ slot, or a ⅛ slot, and Q is a positive integer less than 14.

8. A communications apparatus, comprising:
a processor;
a non-transitory memory storing a program comprising instructions, the instructions being executable by the processor to cause the communications apparatus to:
generate a hybrid automatic repeat request-acknowledgment (HARQ-ACK) codebook corresponding to an $i^{th}$ time domain interval, wherein the $i^{th}$ time domain interval is a time domain interval of N time domain intervals of a slot, i is less than or equal to N, i is a positive integer, N is a positive integer greater than 1, the N time domain intervals form the slot, each of the N time domain intervals corresponding to a different HARQ-ACK codebook of N HARQ-ACK codebooks, the N HARQ-ACK codebooks including the HARQ-ACK codebook; and
send the HARQ-ACK codebook in the slot.

9. The communications apparatus according to claim 8, the instructions being further executable by the processor to cause the communications apparatus to:
receive first downlink information; and
determine, based on a time unit in which the first downlink information is received and a first indicator value, a first time unit in which feedback information corresponding to the first downlink information is instructed to be sent, wherein the first indicator value indicates a quantity of time units between the time unit in which the first downlink information is received and the first time unit; and
wherein when the first time unit belongs to the $i^{th}$ time domain interval, the HARQ-ACK codebook that corresponds to the $i^{th}$ time domain interval comprises the feedback information corresponding to the first time unit.

10. The communications apparatus according to claim 9, wherein the time unit in which the first downlink information is received is the time unit in which a last symbol at a time domain position occupied by the first downlink information is received.

11. The communications apparatus according to claim 9, wherein a length of the first time unit is M symbols, a ½ slot, a ¼ slot, a ⅐ slot, or a ⅛ slot, and M is a positive integer less than 14.

12. The communications apparatus according to claim 9, the instructions being executable by the processor to further cause the communications apparatus to:
receive second indication information from a network device, wherein the second indication information indicates the first indicator value, and the second indication information is carried in higher layer signaling.

13. The communications apparatus according to claim 9, the instructions being executable by the processor to further cause the communications apparatus to:
receive first downlink control information from a network device, wherein:
the first downlink control information indicates the first indicator value; or
the first downlink control information indicates a value in a set of first indicator values to indicate the first indicator value, and the set of first indicator values is predefined, or indicated by higher layer signaling.

14. The communications apparatus according to claim 8, wherein a time domain length of the $i^{th}$ time domain interval is Q symbols, a ½ slot, a ¼ slot, a ⅐ slot, or a ⅛ slot, and Q is a positive integer less than 14.

15. The communications apparatus according to claim 8, the instructions being further executable by the processor to cause the communications apparatus to:
  receive first indication information from a network device, wherein the first indication information indicates a time domain length of the $i^{th}$ time domain interval, and the first indication information is carried in higher layer signaling.

16. The communications apparatus according to claim 8, wherein each HARQ-ACK codebook of the N HARQ-ACK codebooks includes a different feedback information bit generated by jointly encoding acknowledgment (ACK) information and negative acknowledgment (NACK) information intended to be fed back in a time unit.

17. A communications apparatus, comprising:
  a processor; and
  a non-transitory memory storing a program comprising instructions, the instructions being executable by the processor to cause the communications apparatus to:
    receive a hybrid automatic repeat request-acknowledgment (HARQ-ACK) codebook from a terminal device, wherein the HARQ-ACK codebook is a HARQ-ACK codebook corresponding to an $i^{th}$ time domain interval, the $i^{th}$ time domain interval is a time domain interval of N time domain intervals of a slot, i is less than or equal to N, i is a positive integer, N is a positive integer greater than 1, the N time domain intervals form the slot, each of the N time domain intervals corresponding to a different HARQ-ACK codebook of N HARQ-ACK codebooks, the N HARQ-ACK codebooks including the HARQ-ACK codebook, and the HARQ-ACK codebook is received in the slot.

18. The communications apparatus according to claim 17, the instructions being further executable by the processor to cause the communications apparatus to:
  send first downlink information;
  determine a first indicator value; and
  determine a first time unit in which feedback information corresponding to the first downlink information will be received, wherein the first indicator value indicates a quantity of time units between a time unit in which the first downlink information is sent and the first time unit; and
  wherein the first time unit belongs to the $i^{th}$ time domain interval, and the HARQ-ACK codebook corresponding to the $i^{th}$ time domain interval comprises the feedback information corresponding to the first time unit.

19. The communications apparatus according to claim 18, the instructions being executable by the processor to further cause the communications apparatus to:
  send second indication information to the terminal device, wherein the second indication information indicates the first indicator value, and the second indication information is carried in higher layer signaling.

20. The communications apparatus according to claim 18, the instructions being further executable by the processor to cause the communications apparatus to:
  send first downlink control information to the terminal device, wherein:
    the first downlink control information indicates the first indicator value; or
    the first downlink control information indicates a value in a set of first indicator values to indicate the first indicator value, and the set of first indicator values is predefined, or indicated by higher layer signaling.

21. The communications apparatus according to claim 17, the instructions being further executable by the processor to cause the communications apparatus to:
  send first indication information to the terminal device, wherein the first indication information indicates a time domain length of the $i^{th}$ time domain interval, and the first indication information is carried in higher layer signaling.

* * * * *